(12) United States Patent
Lee et al.

(10) Patent No.: US 8,354,757 B2
(45) Date of Patent: Jan. 15, 2013

(54) HYBRID HORIZONTAL AXIS ENERGY APPARATUS

(76) Inventors: William Edward Lee, Kailua, HI (US); Robert F. Pienkowski, Chicago, IL (US)

(*) Notice: Subject to any disclaimer, the term of this patent is extended or adjusted under 35 U.S.C. 154(b) by 0 days.

(21) Appl. No.: 13/043,417

(22) Filed: Mar. 8, 2011

(65) Prior Publication Data

US 2011/0215587 A1 Sep. 8, 2011

Related U.S. Application Data

(60) Provisional application No. 61/311,384, filed on Mar. 8, 2010.

(51) Int. Cl.
*F03D 9/00* (2006.01)
*H02P 9/04* (2006.01)

(52) U.S. Cl. .......................................................... 290/44

(58) Field of Classification Search ............... 290/44, 290/55; 60/641.11, 641.12, 698; 415/4.1, 415/4.2, 4.5; 416/111, 117
See application file for complete search history.

(56) References Cited

U.S. PATENT DOCUMENTS

| | | | | |
|---|---|---|---|---|
| 3,902,072 A * | 8/1975 | Quinn | | 290/44 |
| 4,551,631 A * | 11/1985 | Trigilio | | 290/55 |
| 4,735,382 A * | 4/1988 | Pinson | | 244/150 |
| 5,254,876 A | 10/1993 | Hickey | | |
| 5,275,643 A * | 1/1994 | Usui | | 96/188 |
| 7,045,702 B2 | 5/2006 | Kashyap | | |
| 7,453,167 B2 * | 11/2008 | Gilbert | | 290/55 |
| 7,964,981 B2 * | 6/2011 | Tsao | | 290/44 |
| 2009/0261595 A1 * | 10/2009 | Poo | | 290/55 |
| 2010/0060003 A1 * | 3/2010 | DeAngeles | | 290/44 |
| 2011/0121575 A1 * | 5/2011 | Anetrini et al. | | 290/55 |
| 2011/0215583 A1 * | 9/2011 | Lee et al. | | 290/55 |

* cited by examiner

*Primary Examiner* — Julio R. Gonzalez
(74) *Attorney, Agent, or Firm* — Ash Tankha; Lipton, Weinberger & Husick

(57) ABSTRACT

A hybrid horizontal axis energy apparatus comprising a frame and a rotor assembly rotatably connected to the frame is provided. A drive mechanism is rigidly attached on the rotor assembly and is in engageable communication with an adjacent drive mechanism of an adjacent rotor assembly for rotating the adjacent rotor assembly. One or more solar devices, rigidly attached to the rotor assembly, produce electrical energy. A motor is electrically connected to the solar devices and rotates the rotor assembly about a horizontal axis of the frame on receiving the electrical energy produced by the solar devices. An electrical generator, in engageable communication with the rotor assembly via the drive mechanism, converts mechanical energy produced by the rotation of the rotor assembly to electrical energy. The rotation of the rotor assembly removes light attenuating particles from the solar devices housed on the rotor assembly, thereby increasing efficiency of the solar devices.

19 Claims, 17 Drawing Sheets

HYBRID HORIZONTAL AXIS ENERGY APPARATUS

CROSS REFERENCE TO RELATED APPLICATIONS

This application claims the benefit of provisional patent application No. 61/311,384 titled "Hybrid Horizontal Axis Energy Apparatus", filed on Mar. 8, 2010 in the United States Patent and Trademark Office.

The specification of the above referenced application is incorporated herein by reference in its entirety.

BACKGROUND

A conventional horizontal axis wind turbine harnesses the energy of wind and converts the energy to a form of mechanical energy. The mechanical energy may further be converted to electrical energy based on the application for which the wind turbine is used. The force of wind is highly unpredictable in terms of direction, magnitude, and consistency. Consequently, the force of wind may be inadequate to generate sufficient electrical energy from the wind turbine and meet the requirements of a user. Hence, there is a need for generating electrical energy from more than one source of energy to meet the requirements of the user.

Moreover, there has been little or no effort in the direction of interconnecting two or more wind turbines operatively to produce additional electrical energy and enabling them to follow a wind direction. A single wind turbine is typically used for producing electrical energy, without association with other wind turbines. Wind turbines are typically spaced apart in terms of distance and used in windy areas to produce electrical energy. This singular usage of the wind turbine leads to a limited production of electrical energy, which is again insufficient to meet the requirements of the user.

Therefore, in addition to combining various sources of energy such as wind energy, solar energy, etc., for generating electrical energy, there is a need for interconnecting multiple wind turbines to produce additional electrical energy from changing wind directions.

Furthermore, solar devices provided in wind turbines for generating electrical energy from solar energy, are often exposed to dust and other light attenuating particles, which reduce their efficiency. This leads to a decrease in efficiency of conversion of solar energy into electrical energy by the solar devices.

Hence, there is an unmet but unresolved need for a hybrid horizontal axis energy apparatus that harnesses multiple sources of energy for generating electrical energy and that can be interconnected to additional apparatuses to produce additional electrical energy. Furthermore, there is a need for preventing build up of light attenuating particles, for example, dust, on solar devices provided in the hybrid horizontal axis energy apparatus to increase their efficiency.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The hybrid horizontal axis energy apparatus disclosed herein addresses the above stated needs for harnessing multiple sources of energy, for example, wind energy, solar energy, etc., for generating electrical energy, while being interconnected to additional apparatuses to produce additional electrical energy. This is achieved by providing solar devices that rotate to increase the efficiency and the electrical energy output during operation of the hybrid horizontal axis energy apparatus. Moreover, the hybrid horizontal axis energy apparatus disclosed herein has two or more rotor assemblies interconnected via drive mechanisms. Furthermore, the hybrid horizontal axis energy apparatus disclosed herein prevents build up of light attenuating particles, for example, dust, on the solar devices provided in the hybrid horizontal axis energy apparatus to increase their efficiency.

The hybrid horizontal axis energy apparatus disclosed herein comprises a frame, a rotor assembly, a drive mechanism, one or more solar devices, a motor, and an electrical generator. The frame is configured to receive the rotor assembly. The frame comprises a vertical tower and a stationary axle. The stationary axle having a first end and a second end is perpendicularly connected to the vertical tower. The first end of the stationary axle is rigidly connected to the vertical tower.

The rotor assembly is rotatably connected to the second end of the stationary axle of the frame, for example, via one or more bearings. In an embodiment, the rotor assembly comprises a central rotatable element and multiple blades. The central rotatable element is an encasing that houses and supports a packaged interconnected assembly of solar devices on its surface. The central rotatable element is configured in one of multiple profiles for housing the solar devices to enable the solar devices to receive solar energy from multiple sunlight directions. The profiles of the central rotatable element comprise, for example, a dome profile, a semi-spherical profile, a conical profile, a flat-ended profile, a trapezoidal profile, a pyramidal profile, and any combination thereof.

In an embodiment, the central rotatable element of the rotor assembly comprises a generally curved section and a closed end. The central rotatable element is of a semi-spherical shape or a conical shape. The central rotatable element is rotatably connected to the second end of the stationary axle of the frame. The curved section of the central rotatable element protrudes outwardly to face sunlight. The closed end of the central rotatable element is disposed proximal to the second end of the stationary axle of the frame.

In an embodiment, the central rotatable element that houses the solar devices is disposed on opposing sides of the rotor assembly for increasing exposure of the solar devices to sunlight. In another embodiment, the solar devices are configured as plates spaced apart at predetermined distances on opposing sides of the rotor assembly for increasing exposure of the solar devices to sunlight. The solar devices, in this embodiment, are rigidly connected to and disposed on an extended stationary axle of the frame. In this embodiment, the motor is centrally located within a space defined by each central rotatable element on opposing sides of the rotor assembly.

The blades of the rotor assembly are rigidly connected to a periphery of the central rotatable element. The blades extend radially from the central rotatable element. The rotor assembly rotates in response to a force of wind on the blades and the power generated by the solar devices. In an embodiment, the hybrid horizontal axis energy apparatus disclosed herein further comprises one or more wind sensors disposed on the blades of the rotor assembly for monitoring data, for example, speed, pressure, etc., of the force of wind. The drive mechanism of the hybrid horizontal axis energy apparatus is rigidly attached to the blades of the rotor assembly and encircles the blades. The drive mechanism is, for example, a gear ring, a friction wheel, etc. The drive mechanism rigidly attached to the rotor assembly is in engageable communication with an adjacent drive mechanism rigidly attached to an adjacent rotor assembly. The rotation of the rotor assembly causes rotation of the adjacent rotor assembly via the drive mechanism. The drive mechanism rigidly attached to the rotor assembly transfers mechanical energy produced by rotation of the rotor assembly to the adjacent drive mechanism of the adjacent rotor assembly or to a drive mechanism provided on the electrical generator.

The solar devices are rigidly attached to the curved section of the central rotatable element of the rotor assembly, for example, by adhesion, clamping, threading, or by a support fixture that holds the solar devices onto the central rotatable element. In an embodiment, the solar devices are of a spherical shape to receive solar energy from multiple sunlight directions. The solar devices are exposed to sunlight and convert solar energy of sunlight into electrical energy. In an embodiment, the hybrid horizontal axis energy apparatus disclosed herein further comprises a weatherproof seal that encapsulates the solar devices on the central rotatable element of the rotor assembly for protecting the solar devices from water and weather conditions.

The motor of the hybrid horizontal axis energy apparatus comprises a body and a shaft. The body of the motor is rigidly connected to the closed end of the central rotatable element of the rotor assembly. The shaft of the motor extends from the body of the motor and is rigidly connected to the stationary axle of the frame. The body of the motor is rotatable about the shaft of the motor. Moreover, the motor is electrically connected to the solar devices on the rotor assembly. The motor rotates the rotor assembly about a horizontal axis of the stationary axle of the frame on receiving the electrical energy produced by the solar devices.

The electrical generator is connected proximal to the rotor assembly and in engageable communication with the rotor assembly via the drive mechanism. The drive mechanism rigidly attached to the rotor assembly is, for example, a gear ring or a friction wheel, and a drive mechanism rigidly attached to the electrical generator is a corresponding gear ring or a roller wheel respectively. When the rotor assembly rotates, the drive mechanism rigidly attached to the rotor assembly engageably communicates with the drive mechanism rigidly attached to the electrical generator to rotate the electrical generator. The electrical generator converts mechanical energy produced by the rotation of the rotor assembly to electrical energy. The hybrid horizontal axis energy apparatus thereby produces energy. Furthermore, the rotation of the rotor assembly prevents build up of light attenuating particles for example, dust, on the solar devices rigidly attached to the central rotatable element of the rotor assembly, thereby increasing efficiency of the solar devices.

The body of the motor and the solar devices are rigidly attached to the central rotatable element. Hence, the rotation of the motor tends to rotate the solar devices while rotating the rotor assembly. This rotation of the solar devices while converting solar energy into electrical energy provides an extended life span or better mean time before failure (MTBF) of the solar devices, since the solar devices operate at a lower temperature, thereby offering better electrical energy output. The solar devices are cooled down by ambient air impinging on the solar devices during the rotation of the solar devices. Hence, the life of the solar devices and the efficiency of the solar devices are enhanced over a longer period of time, and the replacement frequency of the solar devices with new solar devices is decreased.

In an embodiment, the hybrid horizontal axis energy apparatus disclosed herein further comprises one or more energy storage devices in electric communication with the solar devices on the central rotatable element of the rotor assembly and the electrical generator. The energy storage devices store the electrical energy produced by the solar devices and the electrical generator.

In an embodiment, the hybrid horizontal axis energy apparatus disclosed herein further comprises one or more slip rings connected to and in electric communication with the solar devices to allow a continuous transfer of the electrical energy from the solar devices to the energy storage devices. The slip rings are disposed on the stationary axle of the frame. The electrical energy stored in one or more of the energy storage devices powers the motor for rotating the rotor assembly, and the electrical energy stored in another one of the energy storage devices is transferred to one or more external energy stations.

In an embodiment, the hybrid horizontal axis energy apparatus disclosed herein further comprises a switch in electric communication with the solar devices, the motor, and the energy storage devices. The switch is configured to transfer the electrical energy produced by the solar devices to the motor and/or the energy storage devices. In an embodiment, the switch electrically disconnects the solar devices from the motor and transfers the electrical energy produced by the solar devices to the energy storage devices. The rotation of the rotor assembly is caused by the force of wind on the blades of the rotor assembly after the electrical disconnection.

In an embodiment, the hybrid horizontal axis energy apparatus disclosed herein further comprises one or more diodes in electric communication with the solar devices, the electrical generator, and the energy storage devices, for blocking reverse flow of electrical energy from the energy storage devices to the solar devices and the electrical generator.

In an embodiment, the hybrid horizontal axis energy apparatus disclosed herein further comprises a control unit, for example, an electronic controller, in electric communication with the solar devices, the electrical generator, and the energy storage devices for monitoring amount of electrical energy produced by the solar devices and the electrical generator, and stored in the energy storage devices. The control unit commands one or more adjustable energy sources to conduct electrical energy from the solar devices or the energy storage devices to the motor for powering the motor.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific components and methods disclosed herein.

DETAILED DESCRIPTION OF THE INVENTION

Figure 1:
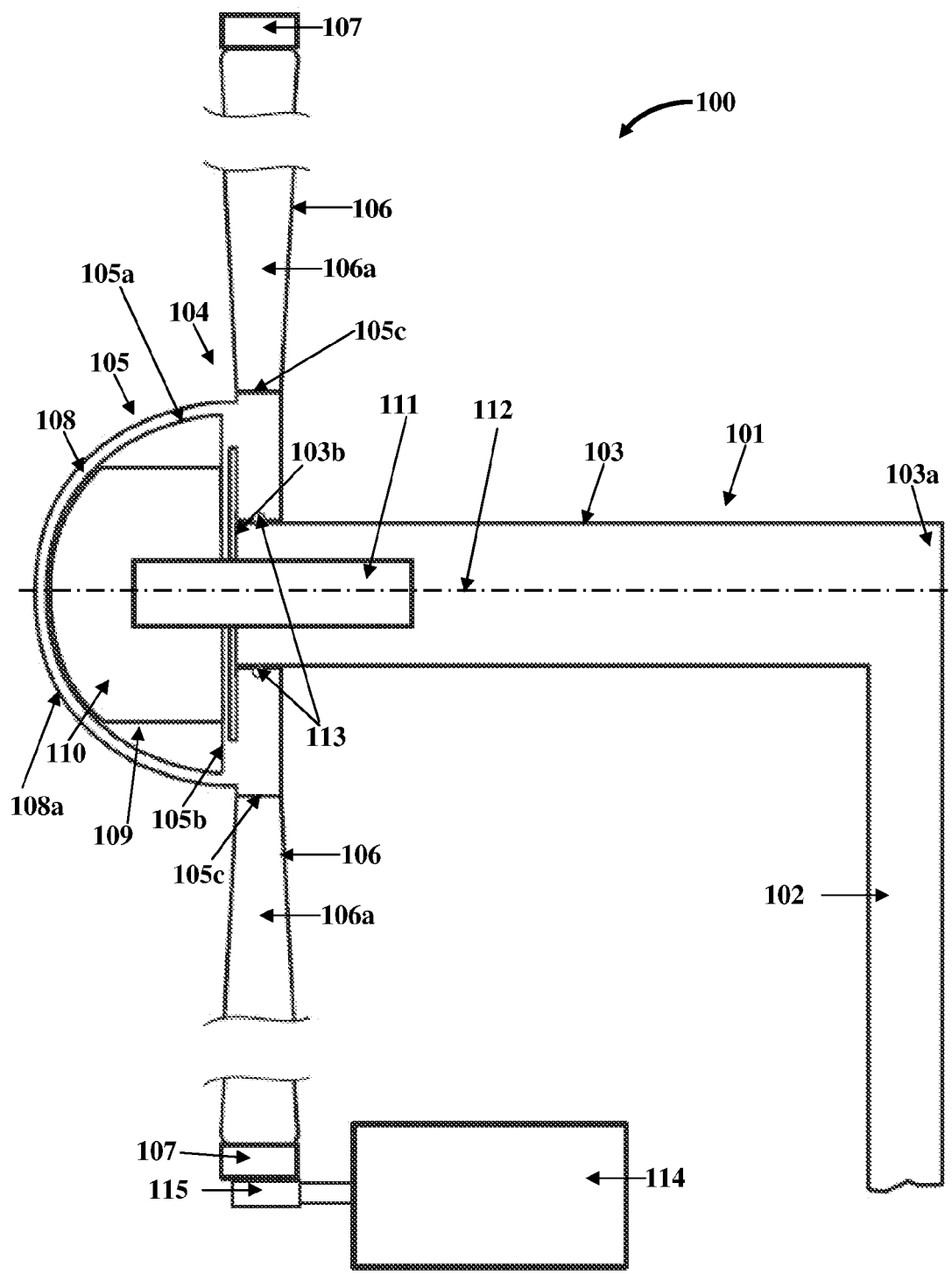
FIG. 1 exemplarily illustrates a side sectional view of a hybrid horizontal axis energy apparatus.

FIG. 1 exemplarily illustrates a side sectional view of a hybrid horizontal axis energy apparatus 100. The hybrid horizontal axis energy apparatus 100 disclosed herein comprises a frame 101, a rotor assembly 104, a drive mechanism 107, one or more solar devices 108, a motor 109, and an electrical generator 114. The frame 101 is configured to receive the rotor assembly 104. In an embodiment as exemplarily illustrated in FIG. 1, the frame 101 comprises a vertical tower 102 and a stationary axle 103. The stationary axle 103, having a first end 103a and a second end 103b, is perpendicularly connected to the vertical tower 102. The first end 103a of the stationary axle 103 is rigidly connected to the vertical tower 102.

The rotor assembly 104 of the hybrid horizontal axis energy apparatus 100 is rotatably connected to the frame 101 and rotates in response to a force of wind and the power generated by the solar devices 108. The rotor assembly 104 is rotatably connected to the second end 103b of the stationary axle 103 of the frame 101, for example, via one or more bearings 113. The rotor assembly 104 comprises a central rotatable element 105 rotatably connected to the second end 103b of the stationary axle 103 of the frame 101. The central rotatable element 105 is an encasing that houses and supports a packaged interconnected assembly of solar devices 108. The central rotatable element 105 protrudes outwardly to face sunlight. The central rotatable element 105 is configured in one of multiple profiles for housing one or more solar devices 108 to enable the solar devices 108 to receive the solar energy from multiple sunlight directions. The profiles of the central rotatable element 105 comprise, for example, a dome profile, a semi-spherical profile, a conical profile, a flat-ended profile, a trapezoidal profile, a pyramidal profile, and any combination thereof. As exemplarily illustrated in FIG. 1 and FIGS. 3-12, the central rotatable element 105 has, for example, a generally semi-spherical profile. In an embodiment, the central rotatable element 105 comprises a generally curved section 105a and a closed end 105b. The curved section 105a houses the solar devices 108 and faces towards sunlight, and the closed end 105b of the central rotatable element 105 is disposed proximal to the second end 103b of the stationary axle 103.

The rotor assembly 104 further comprises multiple blades 106. The blades 106 of the rotor assembly 104 are rigidly connected to a periphery 105c of the central rotatable element 105, for example, by a weld. The blades 106 extend radially from the central rotatable element 105. The rotor assembly 104 rotates in response to a force of wind on the blades 106 and the power generated by the solar devices 108. The drive mechanism 107 is rigidly attached to and encircles the blades 106 of the rotor assembly 104.

The drive mechanism 107 rigidly attached to the rotor assembly 104 is in engageable communication with an adjacent drive mechanism 130 rigidly attached to an adjacent rotor assembly 121 as exemplarily illustrated in FIGS. 6-13. The rotor assembly 104 rotates the adjacent rotor assembly 121 via the drive mechanism 107. In this manner, multiple rotor assemblies 104, 121, 122, 123, 124, 125, 126, 127, 128, and 129 of the hybrid horizontal axis energy apparatus 100 may be connected and driven by their respective drive mechanisms 107, 130, 131, 132, 133, 134, 135, 136, 137, and 138. In an embodiment as exemplarily illustrated in FIGS. 3-4, the drive mechanism 107 is a gear ring 107a rigidly attached to and encircling the blades 106 of the rotor assembly 104. In another embodiment as exemplarily illustrated in FIG. 5, the drive mechanism 107 is a friction wheel 107b rigidly attached to and encircling the blades 106 of the rotor assembly 104.

One or more solar devices 108, for example, photovoltaic cells are rigidly attached to the curved section 105a of the central rotatable element 105 of the rotor assembly 104, for example, by adhesion, by clamping, by threading, by a support fixture that holds the solar devices 108 onto the central rotatable element 105 of the rotor assembly 104, etc. In an embodiment, the surface 106a of the blades 106 of the rotor assembly 104 are lined with the solar devices 108 that transmit the generated electrical energy from the incident sunlight to the motor 109. The solar devices 108 are exposed to sunlight and convert solar energy of sunlight into electrical energy by the photovoltaic effect. The solar devices 108 are made from a semiconductor material. When photons are absorbed by the solar devices 108, electrons from the atoms of the semiconductor material of the solar devices 108 are dislodged from their position. These electrons travel toward a front surface 108a of the solar devices 108 and flow on the front surface 108a of the solar devices 108. This flow of electrons generates electrical energy.

The motor 109 of the hybrid horizontal axis energy apparatus 100 has a body 110 and a shaft 111. The motor 109 is, for example, a direct current (DC) motor. The motor 109 is electrically connected to the solar devices 108. The body 110 of the motor 109 is rigidly connected to the closed end 105b of the central rotatable element 105 of the rotor assembly 104. The shaft 111 of the motor 109 extends from the body 110 of the motor 109 and is rigidly connected to the stationary axle 103 of the frame 101. The body 110 of the motor 109 is rotatable about the shaft 111 of the motor 109. The motor 109 receives electrical energy from the solar devices 108 rigidly attached on the central rotatable element 105 and/or on the blades 106 of the rotor assembly 104. The motor 109 rotates the rotor assembly 104 about a horizontal axis 112 of the stationary axle 103 of the frame 101 on receiving electrical energy produced by the solar devices 108.

The electrical generator 114 of the hybrid horizontal axis energy apparatus 100 is connected proximal to the rotor assembly 104. A drive mechanism 115 of the electrical generator 114 is in engageable communication with the drive mechanism 107 of the rotor assembly 104. The electrical generator 114 converts mechanical energy produced by the rotation of the rotor assembly 104 to electrical energy. The hybrid horizontal axis energy apparatus 100 therefore produces energy. Moreover, the rotation of the rotor assembly 104 prevents build up of light attenuating particles, for example, dust, particulate matter, etc., on the solar devices 108 rigidly attached to the rotor assembly 104.

As disclosed in the detailed description herein, the body 110 of the motor 109 and the solar devices 108 are rigidly attached to the central rotatable element 105. Hence, the rotation of the motor 109 tends to rotate the solar devices 108 while rotating the rotor assembly 104. This rotation of the solar devices 108 while converting solar energy into electrical energy provides an extended life span or better mean time before failure (MTBF) of the solar devices 108, since the solar devices 108 operate at a lower temperature, thereby operating at higher electrical energy efficiency. The solar devices 108 are cooled by ambient air impinging on the solar devices 108 during the rotation of the solar devices 108. Hence, the life of the solar devices 108 is enhanced and sustained, before efficiency of the solar devices 108 reduces due to ageing of the solar devices 108 and depletion of valence electrons in the solar devices 108.

Figure 2:
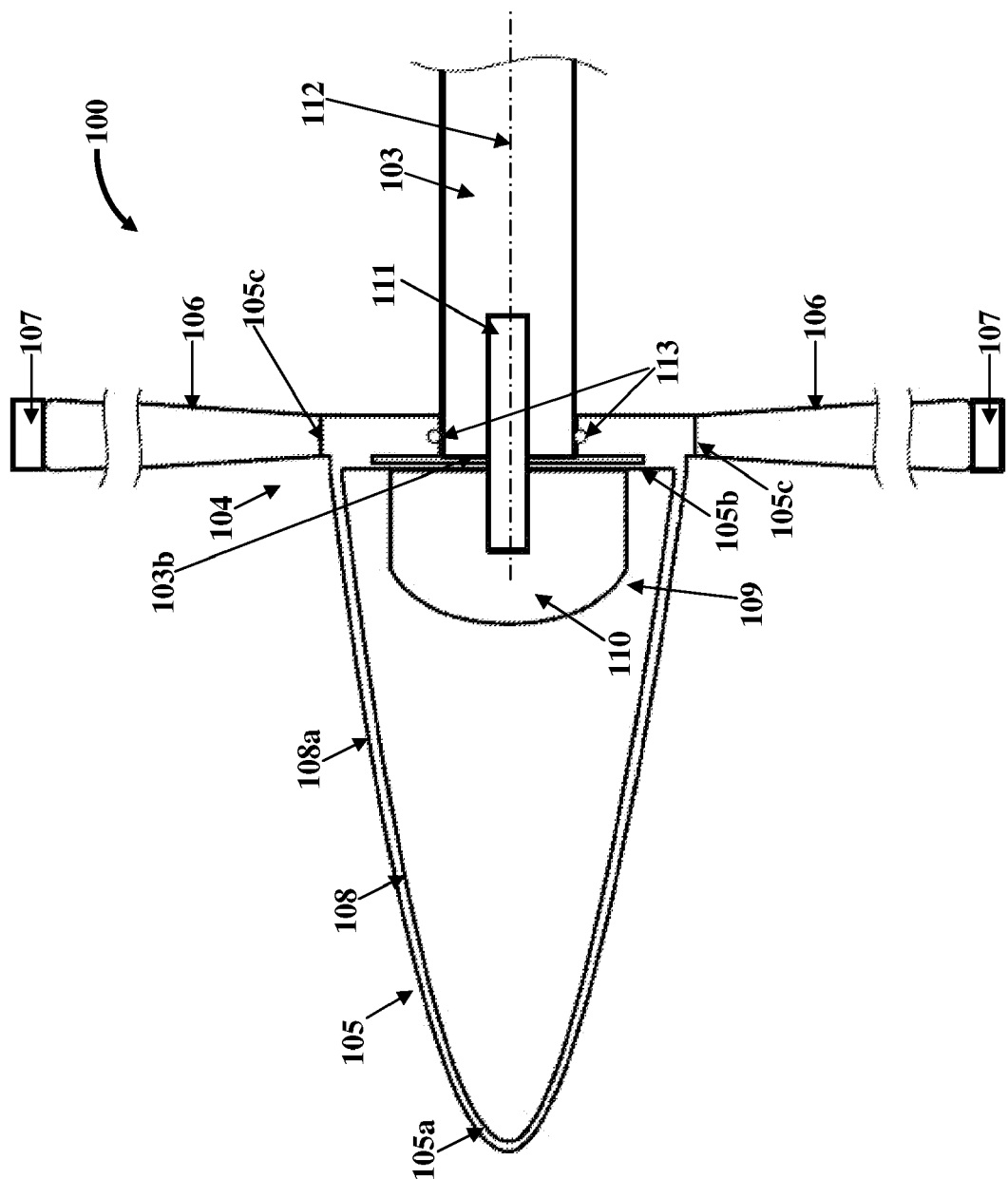
FIG. 2 exemplarily illustrates a side sectional view of an embodiment of the hybrid horizontal axis energy apparatus.

FIG. 2 exemplarily illustrates a side sectional view of an embodiment of the hybrid horizontal axis energy apparatus 100, where the central rotatable element 105 of the rotor assembly 104 is, for example, of a generally conical shape. The conical shape of the central rotatable element 105 increases the area of exposure of the solar devices 108 to sunlight. In an embodiment, the central rotatable element 105 is configured as a nose cone to gauge the direction of wind. The term "nose cone" refers to a conically shaped structure that offers minimum resistance to wind, and pivots to the direction of wind flow.

Figure 3:
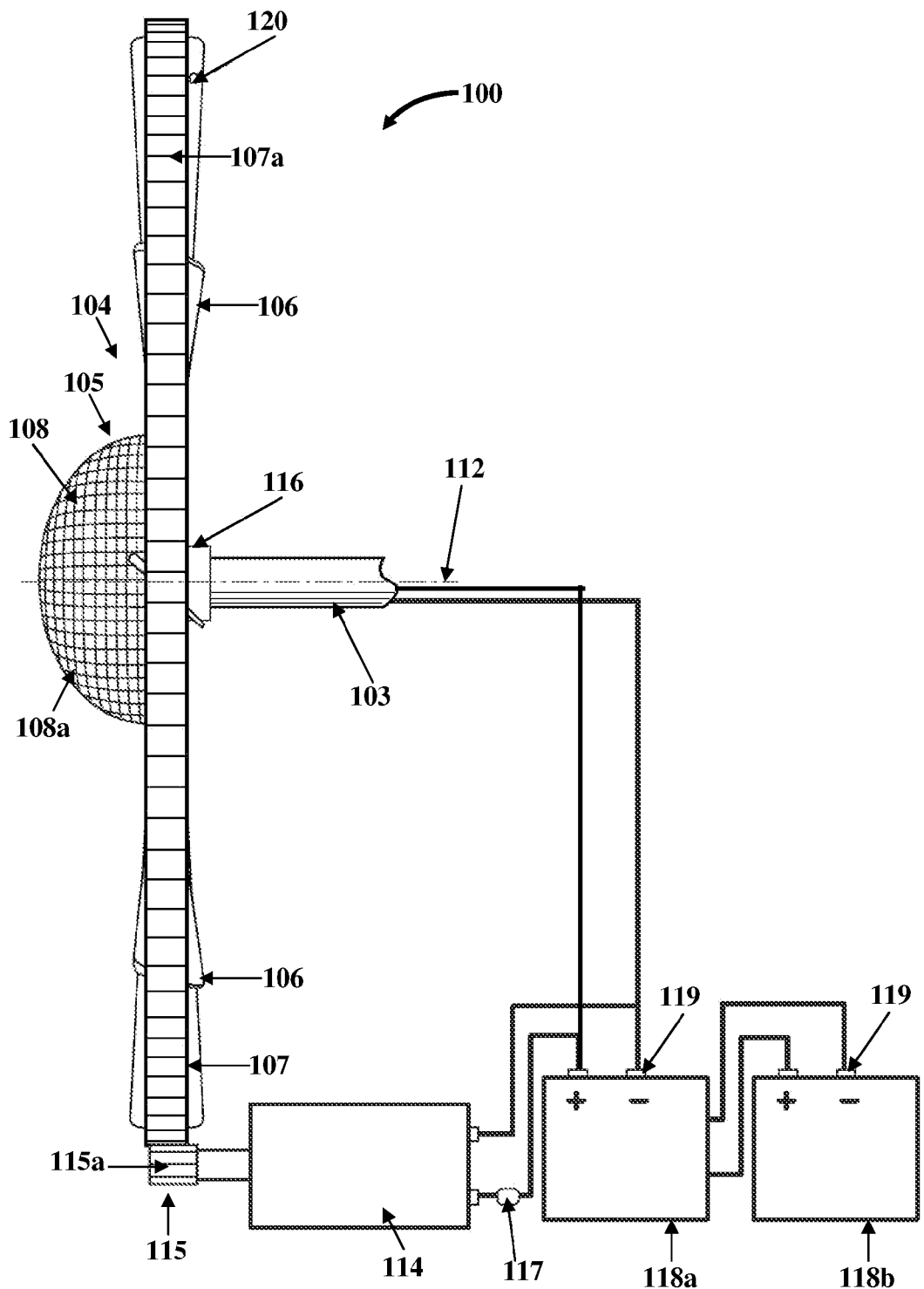
FIG. 3 exemplarily illustrates a side orthogonal view of the hybrid horizontal axis energy apparatus, showing a drive mechanism encircling multiple blades of a rotor assembly, and an electrical generator engageably connected to the rotor assembly and electrically connected to energy storage devices.
Figure 4:
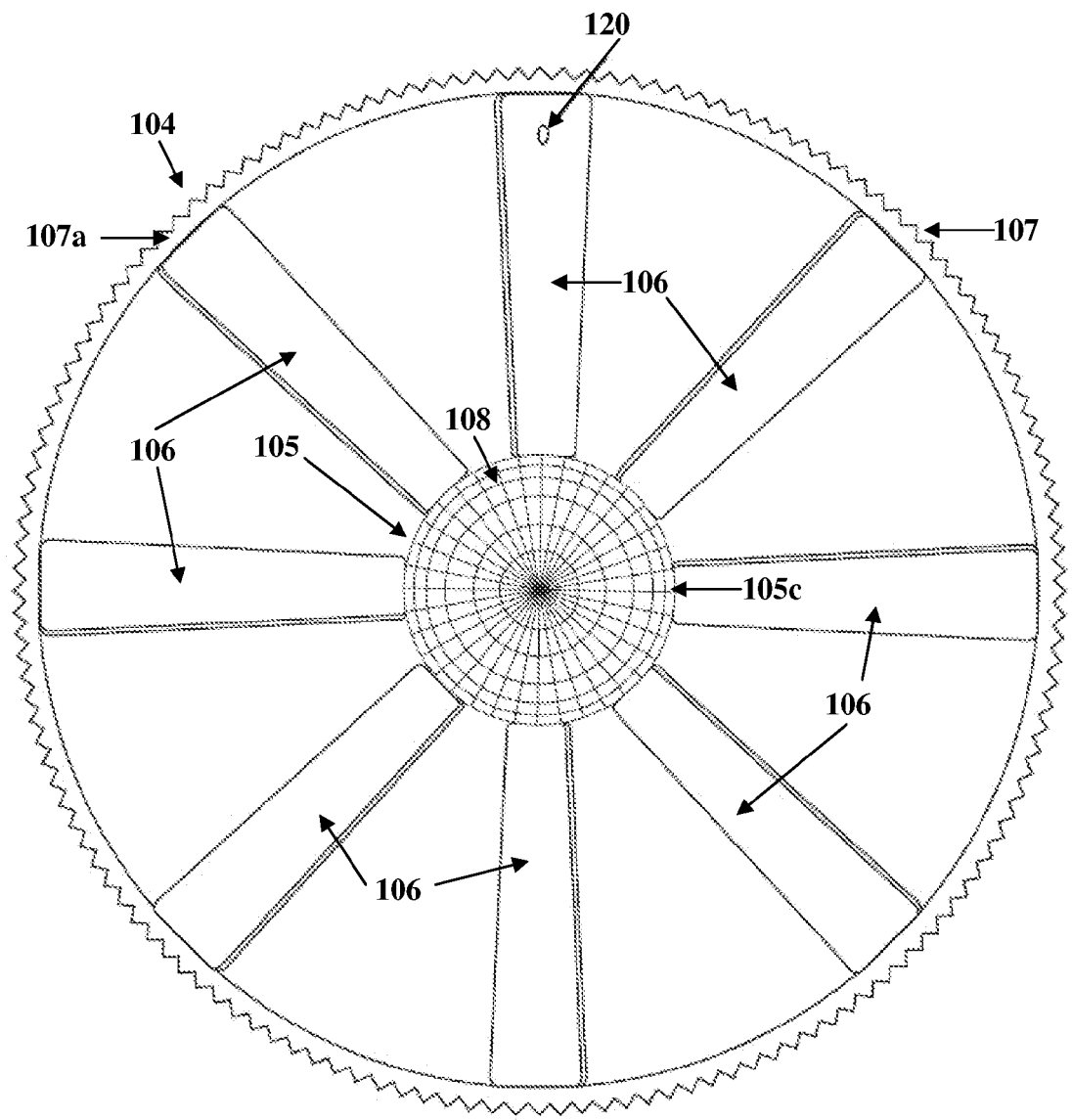
FIG. 4 exemplarily illustrates a front orthogonal view of the hybrid horizontal axis energy apparatus, showing a wind sensor disposed on one of the blades of the rotor assembly.

FIG. 3 and FIG. 4 exemplarily illustrate a side orthogonal view and a front orthogonal view of the hybrid horizontal axis energy apparatus 100 respectively, showing a drive mechanism 107 encircling multiple blades 106 of the rotor assembly 104. FIG. 3 also exemplarily illustrates an electrical generator 114 engageably connected to the rotor assembly 104 and electrically connected to energy storage devices 118a and 118b. The rotor assembly 104 is rotatably connected to the second end 103b of the stationary axle 103. The blades 106 are rigidly connected to the periphery 105c of the central rotatable element 105 and are encircled by the drive mechanism 107. The blades 106 extend radially from the central rotatable element 105 as exemplarily illustrated in FIG. 4.

The drive mechanism 107 exemplarily illustrated in FIGS. 3-4 is a gear ring 107a that encircles the blades 106. The drive mechanism 107 that encircles the blades 106 of the rotor assembly 104 engageably communicates with a drive mechanism 115 rigidly attached to the electrical generator 114. For example, the gear ring 107a, encircling the blades 106, is in engageable communication with a gear ring 115a rigidly attached to the electrical generator 114 as exemplarily illustrated in FIG. 3. The gear ring 107a rigidly attached to the rotor assembly 104 engageably communicates with the gear ring 115a rigidly attached to the electrical generator 114 for transferring mechanical energy produced by the rotation of the rotor assembly 104 to the electrical generator 114. The electrical generator 114 converts the mechanical energy produced by the rotor assembly 104 into electrical energy.

Figure 5:
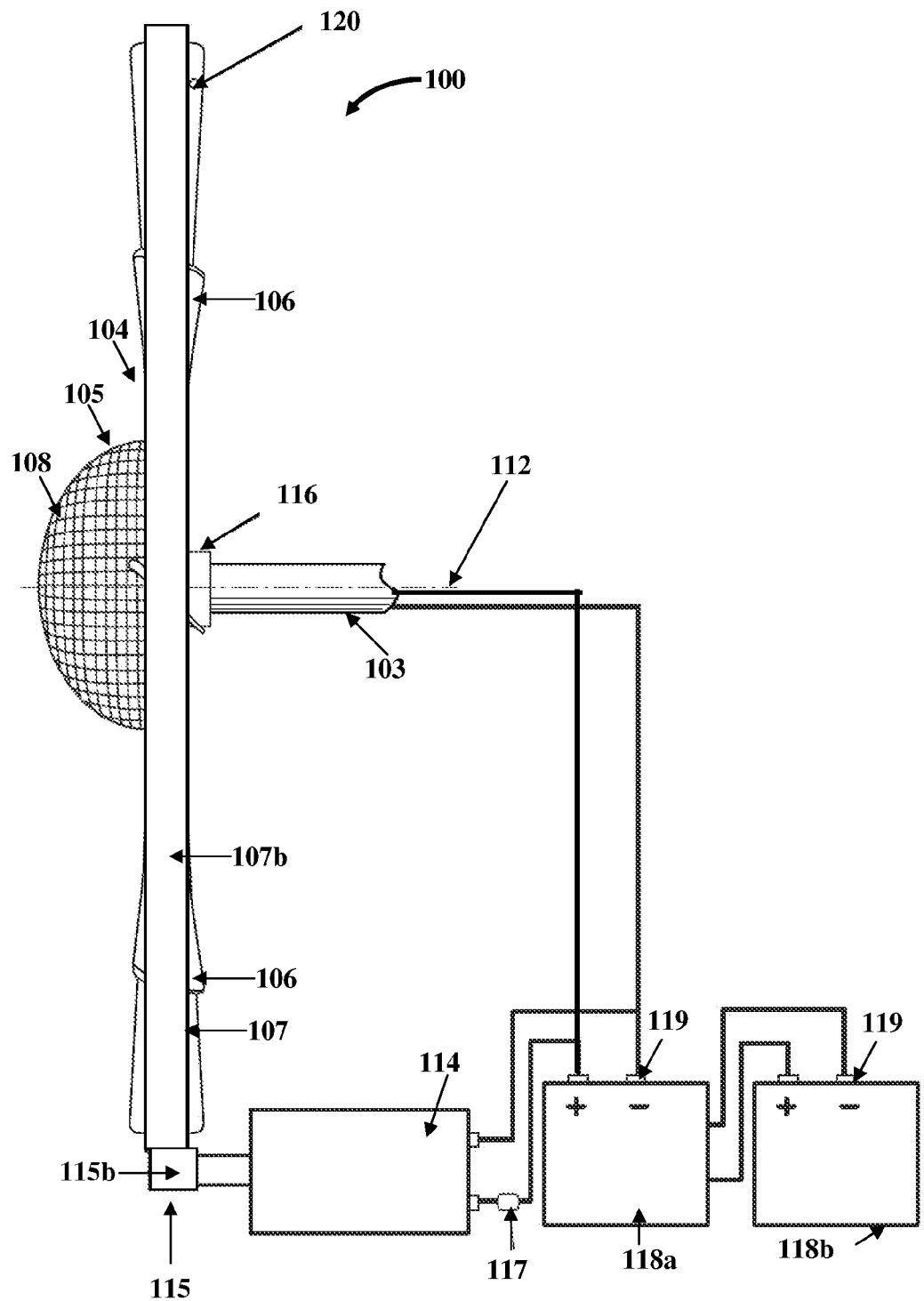
FIG. 5 exemplarily illustrates a side orthogonal view of an embodiment of the hybrid horizontal axis energy apparatus.

In an embodiment as exemplarily illustrated in FIG. 3 and FIG. 5, the hybrid horizontal axis energy apparatus 100 further comprises one or more energy storage devices 118a and 118b in electric communication with the solar devices 108 on the central rotatable element 105 of the rotor assembly 104 and the electrical generator 114. The energy storage devices 118a and 118b store the electrical energy produced by the solar devices 108 and the electrical generator 114.

In an embodiment, the hybrid horizontal axis energy apparatus 100 disclosed herein further comprises a switch 119 in electric communication with the solar devices 108, the motor 109, and the energy storage devices 118a and 118b. The switch 119 is used to break an electrical circuit for interrupting the electrical energy, for example, current or for diverting the electrical energy from the solar devices 108 to the energy storage devices 118a and 118b or from the energy storage devices 118a and 118b to the motor 109. The switch 119 is configured to transfer the electrical energy produced by the solar devices 108 to the motor 109 and/or the energy storage devices 118a and 118b. The electrical energy stored in one of the energy storage devices 118a or 118b powers the motor 109 for rotating the rotor assembly 104, while the electrical energy stored in another one of the energy storage devices 118a or 118b is transferred to one or more external energy stations. For example, the energy storage device 118a transfers the stored electrical energy to the motor 109, for example, during nighttime. The energy storage device 118b provides power to other energy stations, for example, a power grid, a substation, etc. In an embodiment, the switch 119 electrically disconnects the solar devices 108 from the motor 109 and transfers the electrical energy produced by the solar devices 108 to the energy storage devices 118a and 118b. In this embodiment, the rotation of the rotor assembly 104 is caused by the force of wind on the blades 106 of the rotor assembly 104 after the electrical disconnection.

In the presence of sunlight, the switch 119 may be configured to transfer the electrical energy produced by the solar devices 108 to the motor 109 and also to the energy storage devices 118a and 118b, thereby charging the energy storage devices 118a and 118b. In the absence of sunlight, the switch 119 may be configured in such a way that the electrical energy stored in the charged energy storage devices 118a and 118b is transferred to the motor 109 in order to provide a turning moment to the rotor assembly 104. Subsequently, the charged energy storage devices 118a and 118b may continue to remain connected or may be disconnected from the motor 109 as desired by a user depending on parameters such as prevailing wind speed, energy output from the hybrid horizontal axis energy apparatus 100, various other applications such as lighting, heating etc., that the electrical energy may be used for.

During operation, when the blades 106 of the rotor assembly 104 stop rotating and/or when the rotation of the motor 109 stops, a motor power enhancer (not shown) of the motor 109 is used to spin the blades 106 of the rotor assembly 104.

In an embodiment, the hybrid horizontal axis energy apparatus 100 disclosed herein further comprises a slip ring 116 connected to the solar devices 108 and in electric communication with the solar devices 108 to allow a continuous transfer of the electrical energy from the solar devices 108 to the energy storage devices 118a and 118b. The slip ring 116 is disposed on the stationary axle 103 of the frame 101. The slip ring 116 transfers the electrical energy produced by the solar devices 108 to the energy storage devices 118a and 118b for storage of the electrical energy.

In an embodiment, the hybrid horizontal axis energy apparatus 100 disclosed herein further comprises a diode 117 electrically connected between the electrical generator 114 and one of the energy storage devices 118a for conducting electrical energy is only one direction, that is from the electrical generator 114 to the energy storage device 118a. The diode 117 prevents the electrical energy from being transferred back to the electrical generator 114 from the energy storage device 118a.

During operation, when the rotor assembly 104 housing the solar devices 108 rotates, the slip ring 116 mounted on the stationary axle 103 facilitates transfer of electrical energy from the solar devices 108 to the motor 109 and/or to the energy storage devices 118a and 118b. When the rotor assembly 104 is stationary, the electrical energy that is available in one of the energy storage devices 118a and 118b is transferred to the motor 109. Therefore, the hybrid horizontal axis energy apparatus 100 disclosed herein facilitates bidirectional transfer of power from the solar devices 108 to the energy storage devices 118a and 118b via the slip ring 116 when the rotor assembly 104 housing the solar devices 108 rotates continuously, and from the energy storage devices 118a and 118b to the motor 109 when the rotor assembly 104 is stationary. The hybrid horizontal axis energy apparatus 100 disclosed herein regulates the electrical energy to flow in a direction to serve the requirements of a user. For example, electrical energy flows from the solar devices 108 on the rotor assembly 104 to the motor 109, or from the energy storage devices 118a and 118b to the motor 109, or from the solar devices 108 to the energy storage devices 118a and 118b, for example, by the switch 119, a diode 117, etc.

FIGS. 3-4 also exemplarily illustrate a wind sensor 120 disposed on one of the blades 106 of the rotor assembly 104. In an embodiment, one or more wind sensors 120 are disposed on one or more blades 106 of the rotor assembly 104 for monitoring data of the force of wind. The wind sensors 120 measure the wind's speed and pressure. The wind sensors 120 gauge the speed of the wind and ensure that the central rotatable element 105 of the rotor assembly 104 rotates only when the wind speed is slow and/or minimal. In an embodiment, an anemometer (not shown) is used for measuring wind speed. In another embodiment, a tachometer (not shown) can be used to measure the speed of rotation of the rotor assembly 104.

In an embodiment, the hybrid horizontal axis energy apparatus 100 disclosed herein further comprises a weatherproof seal (not shown) that encapsulates the solar devices 108 on the central rotatable element 105 of the rotor assembly 104 for protecting the solar devices 108 from water and weather conditions.

FIG. 5 exemplarily illustrates a side orthogonal view of an embodiment of the hybrid horizontal axis energy apparatus 100. In another embodiment, the drive mechanism 107 is a friction wheel 107b rigidly attached to and encircling the blades 106 of the rotor assembly 104. The friction wheel 107b rigidly attached to the rotor assembly 104 engageably communicates with, for example, a roller wheel 115b made of rubber rigidly attached on the electrical generator 114 for transferring mechanical energy of the rotor assembly 104 to the electrical generator 114. For purposes of illustration, the detailed description refers to drive mechanisms 107 and 115, for example, gear rings 107a and 115a and friction wheels 107b and 115b for transferring mechanical energy from one rotor assembly 104 to an adjacent rotor assembly 121 or to the electrical generator 114; however the scope of the hybrid horizontal axis energy apparatus 101 disclosed herein is not limited to gear rings 107a and 115a and friction wheels 107b and 115b but may be extended to include other forms of drive systems, for example, chain drives, belt drives, and other functionally equivalent structures.

Figure 6:
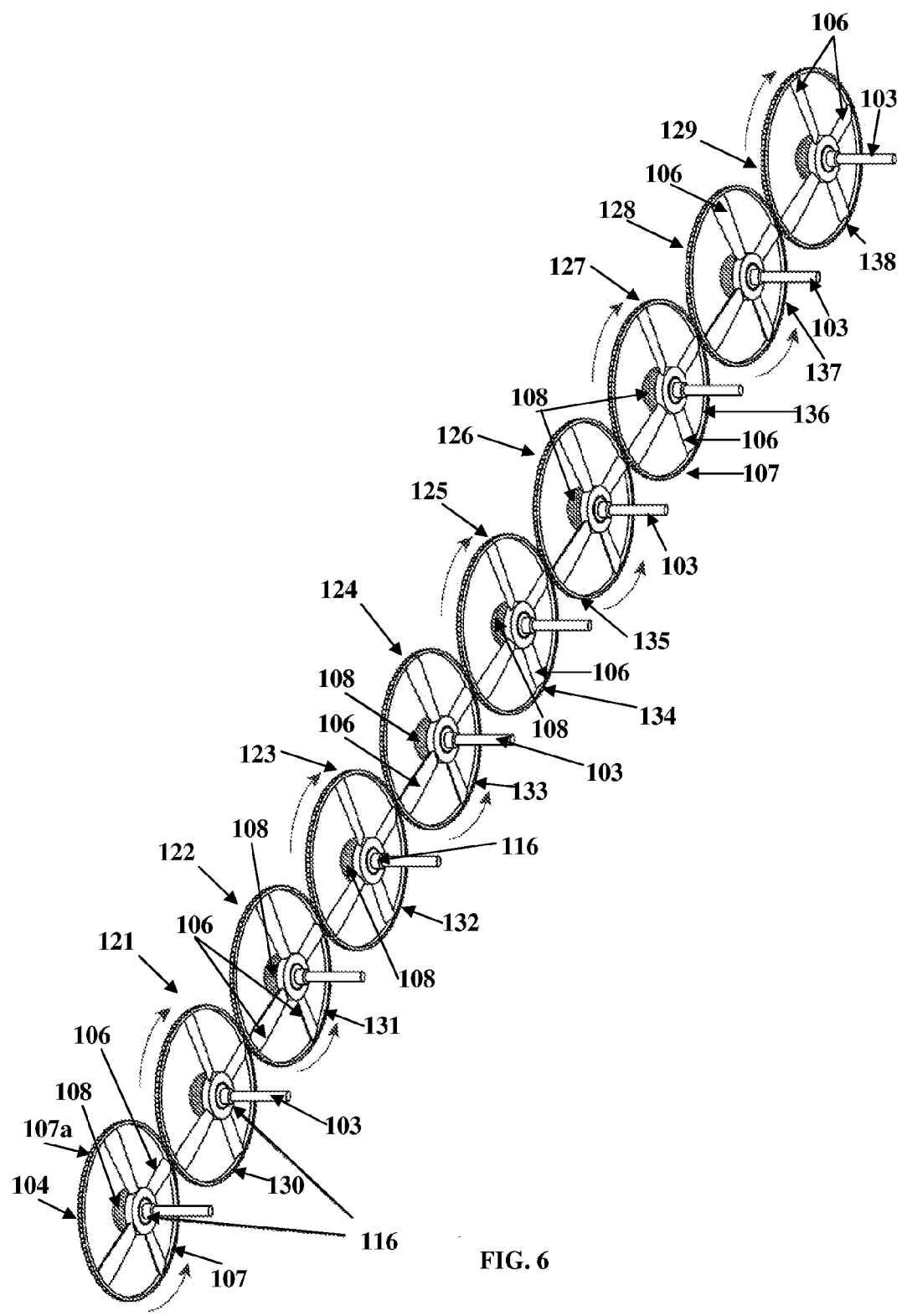
FIG. 6 exemplarily illustrates a perspective view of multiple rotor assemblies of the hybrid horizontal axis energy apparatus engaged via associated drive mechanisms, showing directions of rotation of each of the rotor assemblies.

FIG. 6 exemplarily illustrates a perspective view of multiple rotor assemblies 104, 121, 122, 123, 124, 125, 126, 127, 128, and 129 engaged via associated drive mechanisms 107, 130, 131, 132, 133, 134, 135, 136, 137, and 138 respectively, showing directions of rotation of each of the rotor assemblies 104, 121, 122, 123, 124, 125, 126, 127, 128, and 129. The drive mechanism 107 is rigidly attached to and encircles the blades 106 of the rotor assembly 104. The drive mechanism 107 of the rotor assembly 104 engageably communicates with the adjacent drive mechanism 130 of an adjacent rotor assembly 121, while the adjacent drive mechanism 130 of the adjacent rotor assembly 121 engageably communicates with another adjacent drive mechanism 131 of another adjacent rotor assembly 122 and so on. Each of the rotor assemblies 104, 121, 122, 123, 124, 125, 126, 127, 128, and 129 rotates in response to a force of wind on the blades 106 and the power generated by the solar devices 108 rigidly attached to the rotor assemblies 104, 121, 122, 123, 124, 125, 126, 127, 128, and 129.

When a force of wind impacts the blades 106 of a first rotor assembly 104 among the rotor assemblies 104, 121, 122, 123, 124, 125, 126, 127, 128, and 129, the first rotor assembly 104 rotates about the horizontal axis 112 of the stationary axle 103, for example, in a counterclockwise direction. The first rotor assembly 104 may also rotate about the horizontal axis 112 of the stationary axle 103 due to rotation of the motor 109 about its shaft 111 on being powered by the solar devices 108. The drive mechanism 107 of the first rotor assembly 104, in engageable communication with the drive mechanism 130 of a second rotor assembly 121 among the rotor assemblies 104, 121, 122, 123, 124, 125, 126, 127, 128, and 129, causes the second rotor assembly 121 to rotate about the horizontal axis 112 of the stationary axle 103, for example, in a clockwise direction. In this manner, each of the rotor assemblies 104, 121, 122, 123, 124, 125, 126, 127, 128, and 129 in engageable communication with an adjacent one of the rotor assemblies 121, 123, 124, 125, 126, 127, 128, and 129 causes the adjacent one of the rotor assemblies 121, 123, 124, 125, 126, 127, 128, and 129 to rotate about the horizontal axis 112 of their respective stationary axles 103 in a direction opposite to its direction of rotation.

In the embodiment exemplarily illustrated in FIG. 6, the drive mechanisms 107, 130, 131, 132, 133, 134, 135, 136, 137, and 138 of the rotor assemblies 104, 121, 122, 123, 124, 125, 126, 127, 128, and 129 respectively are gear rings 107a. The gear ring 107a on each of the rotor assemblies 104, 121, 122, 123, 124, 125, 126, 127, 128, and 129 engageably communicate with an adjacent gear ring 107a rigidly attached on an adjacent one of the rotor assemblies 121, 122, 123, 124, 125, 126, 127, 128, and 129. The gear ring 107a transfers the mechanical energy of the associated rotor assembly 104 to the gear ring 107a of an adjacent one of the rotor assemblies 121, 122, 123, 124, 125, 126, 127, 128, and 129 or to the gear ring 115a of the electrical generator 114.

In an embodiment, the blades 106 of each of the rotor assemblies 104, 121, 122, 123, 124, 125, 126, 127, 128, and 129 are positioned at a predetermined twist angle. The blades 106 on each of the adjacent rotor assemblies 121, 122, 123, 124, 125, 126, 127, 128, and 129 is preferably positioned in an opposite twist angle to enable rotation of the adjacent rotor assemblies 121, 122, 123, 124, 125, 126, 127, 128, and 129 in opposite directions, for example, a clockwise direction or a counterclockwise direction.

Figure 7:
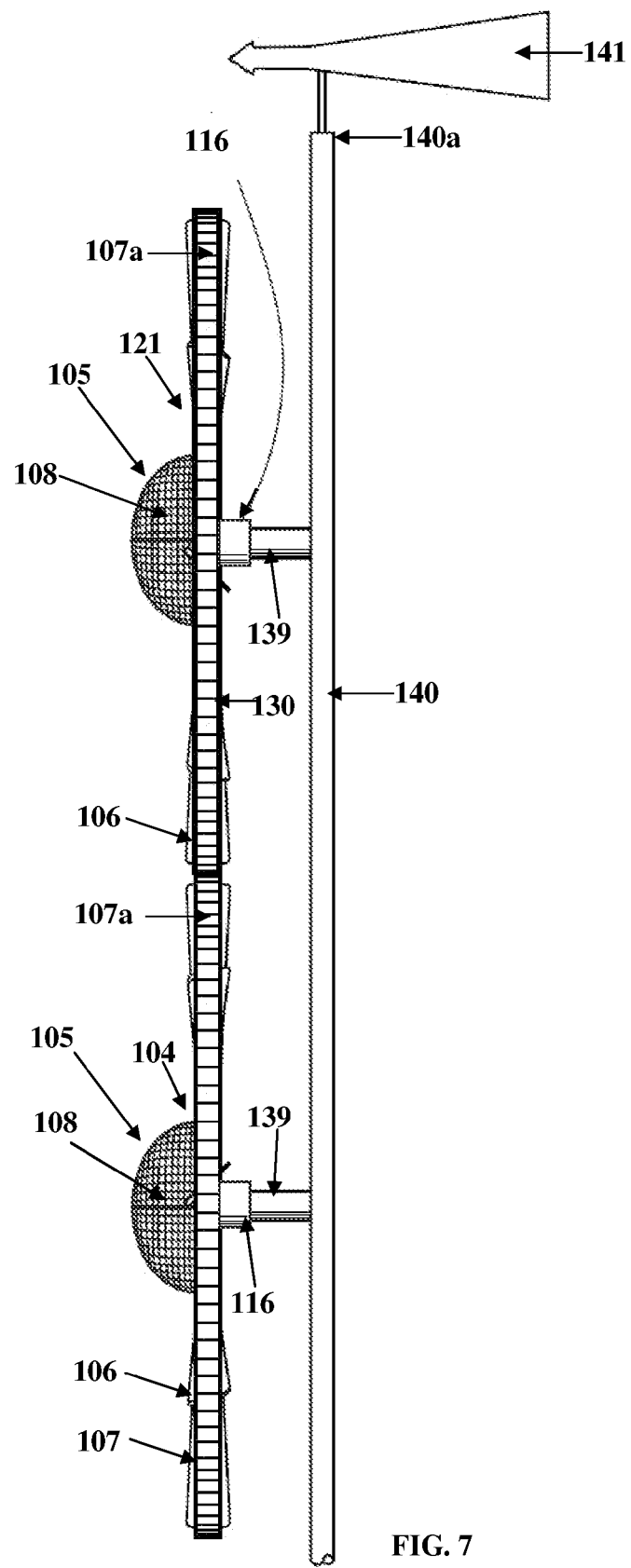
FIG. 7 exemplarily illustrates a side orthogonal view of rotor assemblies of the hybrid horizontal axis energy apparatus engaged via associated drive mechanisms.

FIG. 7 exemplarily illustrates a side orthogonal view of rotor assemblies 104 and 121 of the hybrid horizontal axis energy apparatus 100 engaged via associated drive mechanisms 107 and 130. In this embodiment, a rotary sleeve 140 having multiple secondary stationary axles 139 is provided in place of the stationary axles 103. The secondary stationary axles 139 are positioned perpendicular to the rotary sleeve 140. The drive mechanism 107 rigidly attached to the rotor assembly 104 engageably communicates with the drive mechanism 130 rigidly attached to the adjacent rotor assembly 121. A slip ring 116, in electric communication with the solar devices 108 rigidly attached to each of the rotor assemblies 104 and 121, is disposed on each of the secondary stationary axles 139. An upper section 140a of the rotary sleeve 140 is rigidly connected to a wind seeking vane 141 that determines the direction of wind. The rotary sleeve 140 is rotatably connected, for example, by a swivel bearing 145 as exemplarily illustrated in FIG. 8, to the vertical tower 102. In an embodiment, the rotary sleeve 140 is, for example, about a 3.5 inch diameter hollow pipe while the vertical tower 102 is, for example, about a 3 inch diameter solid pipe. In this case, the 3.5 inch diameter hollow pipe encircles the 3 inch diameter solid pipe and rotates about the 3 inch diameter solid pipe. In another embodiment, the rotary sleeve 140 may rotate within a hollow vertical tower 102. The wind seeking vane 141 responds to a change in direction of wind and rotates to offer a minimum resistance to the force of wind. The wind seeking vane 141 therefore assists to rotate the rotor assembly 104 and the rotary sleeve 140 about the swivel bearing 145 disposed on the vertical tower 102.

Figure 8:
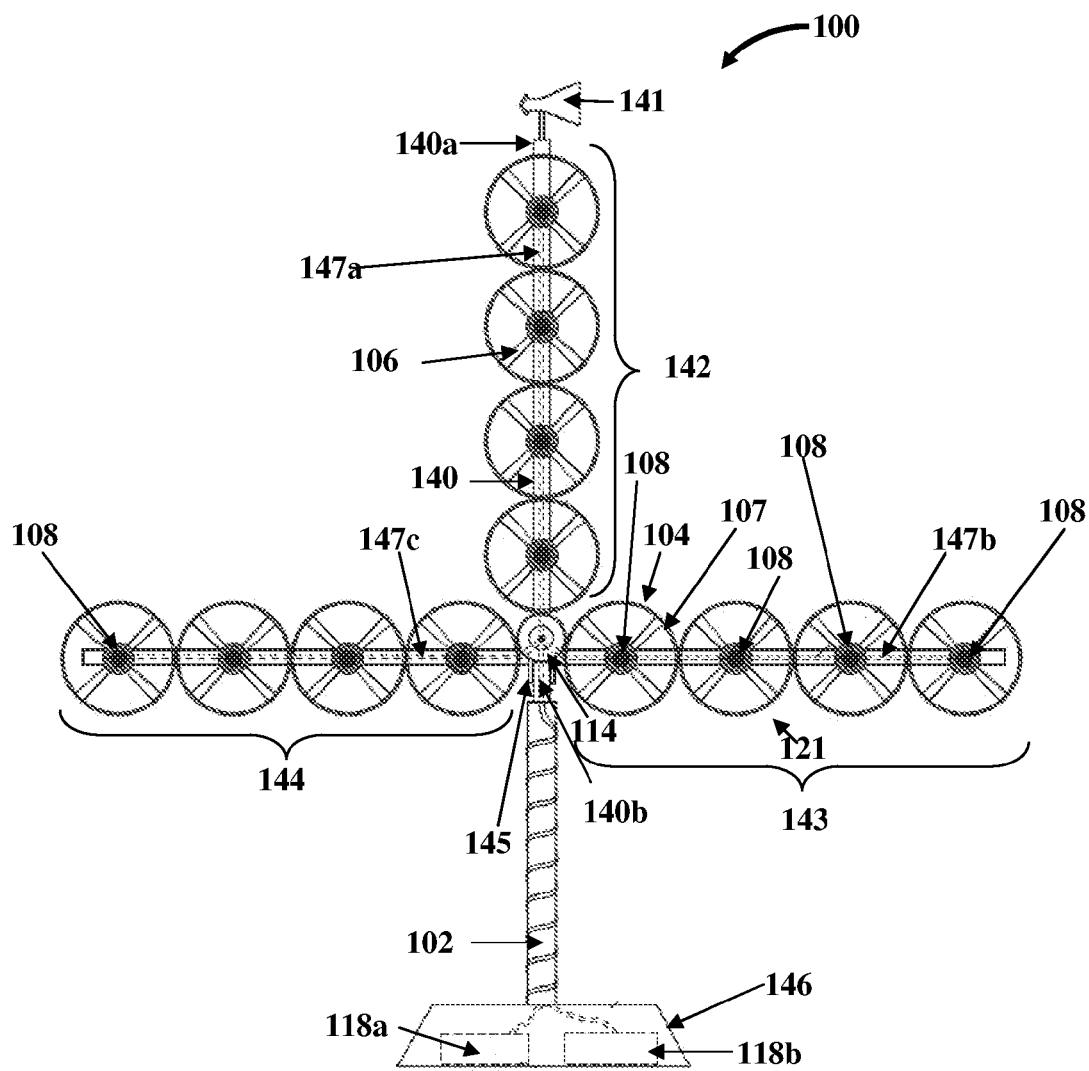
FIG. 8 exemplarily illustrates a front orthogonal view of multiple rotor assemblies of the hybrid horizontal axis energy apparatus engaged via associated drive mechanisms.
Figure 9:
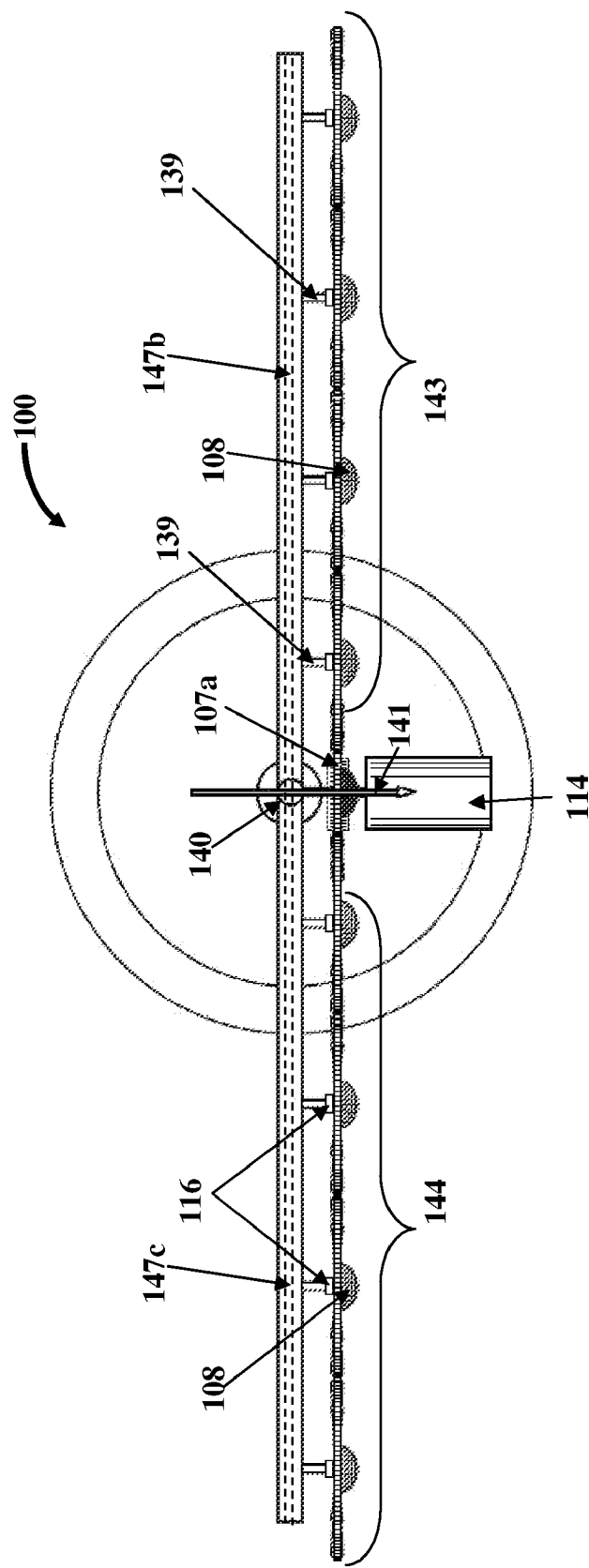
FIG. 9 exemplarily illustrates a top orthogonal view of multiple rotor assemblies of the hybrid horizontal axis energy apparatus engaged via associated drive mechanisms.

FIG. 8 and FIG. 9 exemplarily illustrate a front orthogonal view and a top orthogonal view of multiple rotor assemblies 142, 143, and 144 of the hybrid horizontal axis energy apparatus 100 engaged via associated drive mechanisms 107 respectively. In this embodiment, the rotor assemblies 142, 143, and 144 are arranged in a cross configuration, wherein a first set of multiple rotor assemblies 142, a second set of multiple rotor assemblies 143, and a third set of multiple rotor assemblies 144 are arranged mutually perpendicular to each other. The first set of rotor assemblies 142, the second set of rotor assemblies 143, and the third set of rotor assemblies 144 independently rotate in response to a force of wind in different directions. A single electrical generator 114 is disposed proximal to the first set of rotor assemblies 142, the second set of rotor assemblies 143, and the third set of rotor assemblies 144. The single electrical generator 114 converts mechanical energy of the rotor assemblies 142, 143, and 144 to electrical energy. For example, a single electrical generator 114 is disposed, for example, at the center of the cross configuration as exemplarily illustrated in FIGS. 8-12, or above, below, alongside, or at a rear end of the rotor assemblies 142, 143, and 144.

Positive and negative electrical wires 147a, 147b, and 147c connect each of the solar devices 108 on each of the rotor assemblies 142, 143, and 144 respectively to the energy storage devices 118a and 118b. The electrical wires 147a, 147b, and 147c run externally along the rotary sleeves 140 configured, for example, in a cross configuration. The electrical wires 147a from the first set of rotor assemblies 142, the electrical wires 147b from the second set of rotor assemblies 143, and the electrical wires 147c from the third set of rotor assemblies 144 meet the centrally located electrical generator 114 as exemplarily illustrated in FIG. 8 and FIG. 11. The electrical wires 147a, 147b, and 147c are then wound around the vertical tower 102 and electrically connected to the energy storage devices 118a and 118b at a base 146 of the vertical tower 102. In an embodiment, the electrical wires 147a, 147b, and 147c instead of being wound around the vertical tower 102 can be electrically connected to slip rings (not shown) at the junction 140b where the electrical wires 147a, 147b, and 147c meet.

The electrical generator 114 is also in electric communication with the energy storage devices 118a and 118b, for example, via electrical wires (not shown). The electrical wires (not shown) of the electrical generator 114 are also wound around the vertical tower 102 and electrically connected to the energy storage devices 118a and 118b at the base 146 of the vertical tower 102. The electrical wires 147a, 147b, and 147c, in the form of a double wiring arrangement, externally wound around the vertical tower 102 assist the rotor assemblies 142, 143, and 144 to make a definite number of rotations with respect to the vertical tower 102. This enables the first set of rotor assemblies 142, the second set of rotor assemblies 143, and the third set of rotor assemblies 144 to swivel about the vertical tower 102 via the swivel bearing 145, without causing twisting or entangling of the electrical wires 147a, 147b, and 147c.

Although the slip rings 116 disclosed herein enable indefinite rotations of the rotor assemblies 142, 143, and 144 with respect to the vertical tower 102, while transferring electrical energy to the energy storage devices 118a and 118b, the indefinite rotations of the rotor assemblies 142, 143, and 144 with respect to the vertical tower 102 with transfer of electrical energy to the energy storage devices 118a and 118b may also be accomplished using other functionally equivalent structures, for example, a clutch, double clutch, etc.

During operation of the hybrid horizontal axis energy apparatus 100, each of the rotor assemblies 104 in the sets 142, 143, and 144 rotates in an opposite direction, for example, a clockwise direction or a counterclockwise direction, to an adjacent one of the rotor assemblies 121. The mechanical energy of each of the rotor assemblies 104 in the sets 142, 143, and 144 is communicated via the associated drive mechanisms 107 and lastly transferred from one of the drive mechanisms 107 of the associated rotor assembly 104 to the electrical generator 114 disposed proximal to the rotor assembly 104.

Figure 10:
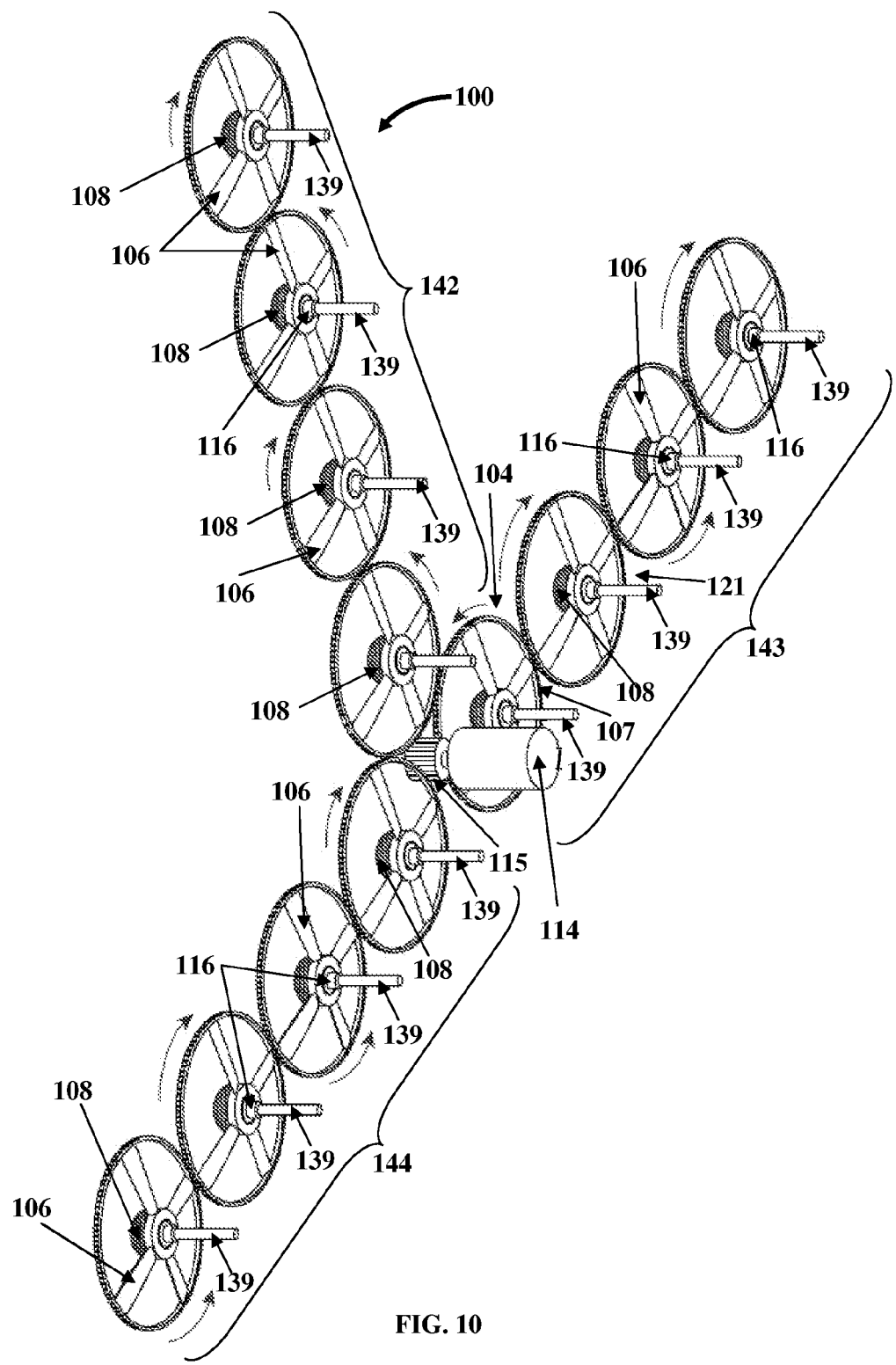
FIG. 10 exemplarily illustrates a perspective view of multiple rotor assemblies of the hybrid horizontal axis energy apparatus engaged via associated drive mechanisms, showing an electrical generator engageably communicating with the rotor assemblies.

FIG. 10 exemplarily illustrates a perspective view of multiple rotor assemblies 142, 143, and 144 of the hybrid horizontal axis energy apparatus 100 engaged via associated drive mechanisms, for example, 107. FIG. 10 also exemplarily illustrates an electrical generator 114 engageably communicating with the rotor assemblies 142, 143, and 144. The electrical generator 114 is disposed, for example, at the center of the cross configuration formed by the first set of rotor assemblies 142, the second set of rotor assemblies 143, and the third set of rotor assemblies 144. The drive mechanism 115 of the electrical generator 114 engageably communicates with the drive mechanism 107 of each of the rotor assemblies 104 in the sets 142, 143, and 144.

Figure 11:
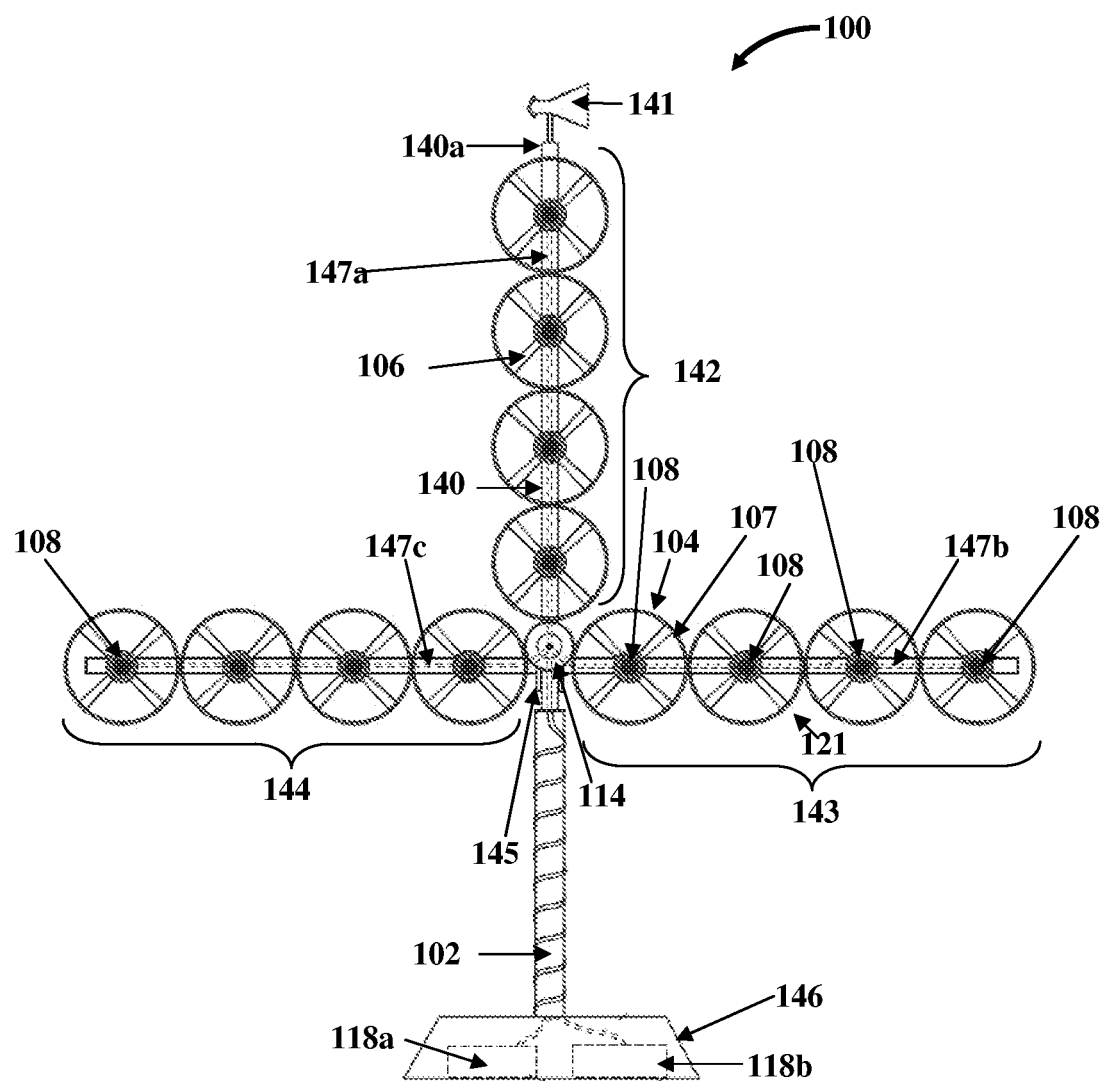
FIG. 11 exemplarily illustrates a front orthogonal view of multiple rotor assemblies of an embodiment of the hybrid horizontal axis energy apparatus, engaged via associated drive mechanisms.
Figure 12:
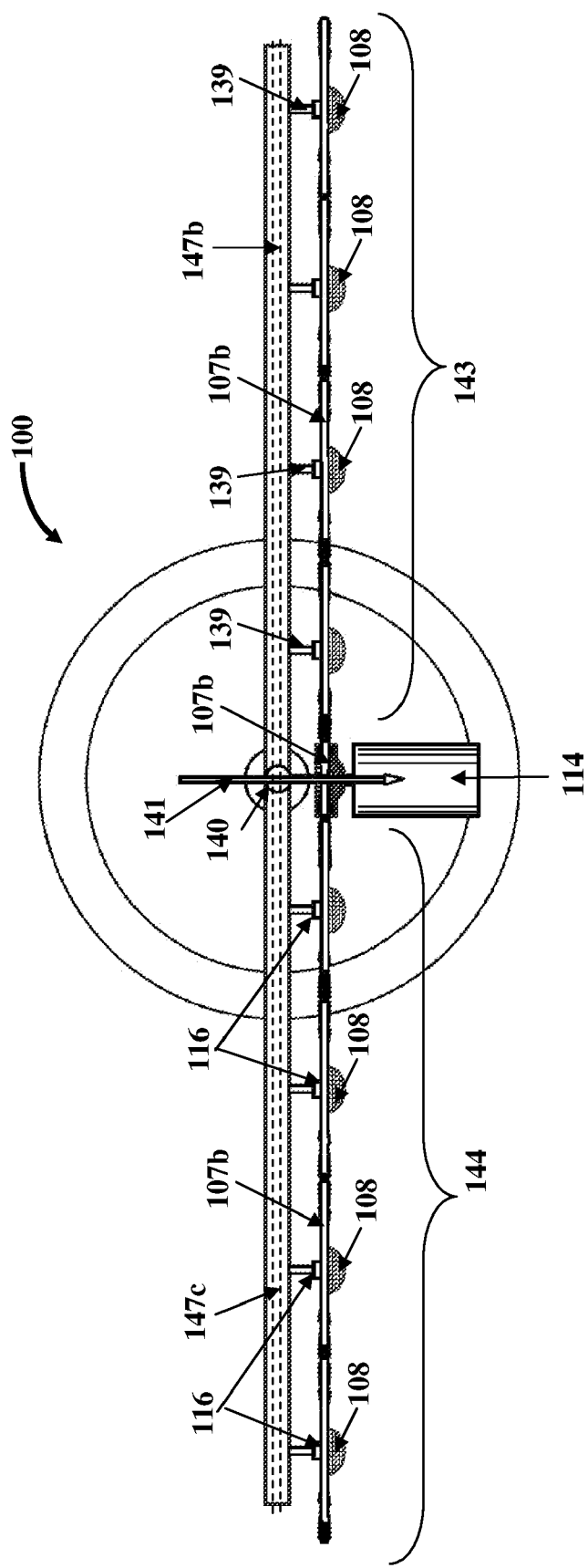
FIG. 12 exemplarily illustrates a top orthogonal view of multiple rotor assemblies of an embodiment of the hybrid horizontal axis energy apparatus, engaged via associated drive mechanisms.

FIG. 11 and FIG. 12 exemplarily illustrate a front orthogonal view and a top orthogonal view of multiple rotor assemblies 142, 143, and 144 of an embodiment of the hybrid horizontal axis energy apparatus 100 engaged via associated drive mechanisms 107. In this embodiment, a specialized friction wheel 107b working on a frictional contact force is incorporated in the horizontal axis energy apparatus 100 to encircle the blades 106 of each of the rotor assemblies 104 in the sets 142, 143, and 144. Similarly, a roller wheel 115b working on a frictional contact force is provided on the electrical generator 114. The friction wheel 107b and the roller wheel 115b are made of a substantially elastomeric material having a rough texture, for example, rubber. Each of the friction wheels 107b and the roller wheel 115b are of a generally circular shape. The friction wheel 107b transfers the mechanical energy of the associated rotor assembly 104 to the adjacent friction wheel 107b rigidly attached on an adjacent rotor assembly 104 by a force of rolling friction. When adjacent friction wheels 107b are in contact with each other, the force of rolling friction is transferred from one friction wheel 107b to an adjacent friction wheel 107b and hence the mechanical energy is transferred from one friction wheel 107b to the adjacent friction wheel 107b and subsequently from one rotor assembly 104 to the adjacent rotor assembly 121 or to the electrical generator 114 as the case may be.

The mechanical energy of each of the rotor assemblies 104 in the sets 142, 143, and 144 is transferred to an adjacent one of the rotor assemblies 121 by frictional contact between the friction wheels 107b, or to the electrical generator 114 by the frictional contact between the friction wheel 107b on one of the rotor assemblies 104 and the roller wheel 115b of the electrical generator 114 as exemplarily illustrated in FIG. 5. That is, the frictional force between the friction wheels 107b is employed to transfer mechanical energy from one rotor assembly 104 to an adjacent one of the rotor assemblies 121. The frictional force between the friction wheel 107b on one rotor assembly 104 and the roller wheel 115b of the electrical generator 114 is employed to transfer mechanical energy from the rotor assembly 104 to the electrical generator 114.

Figure 13:
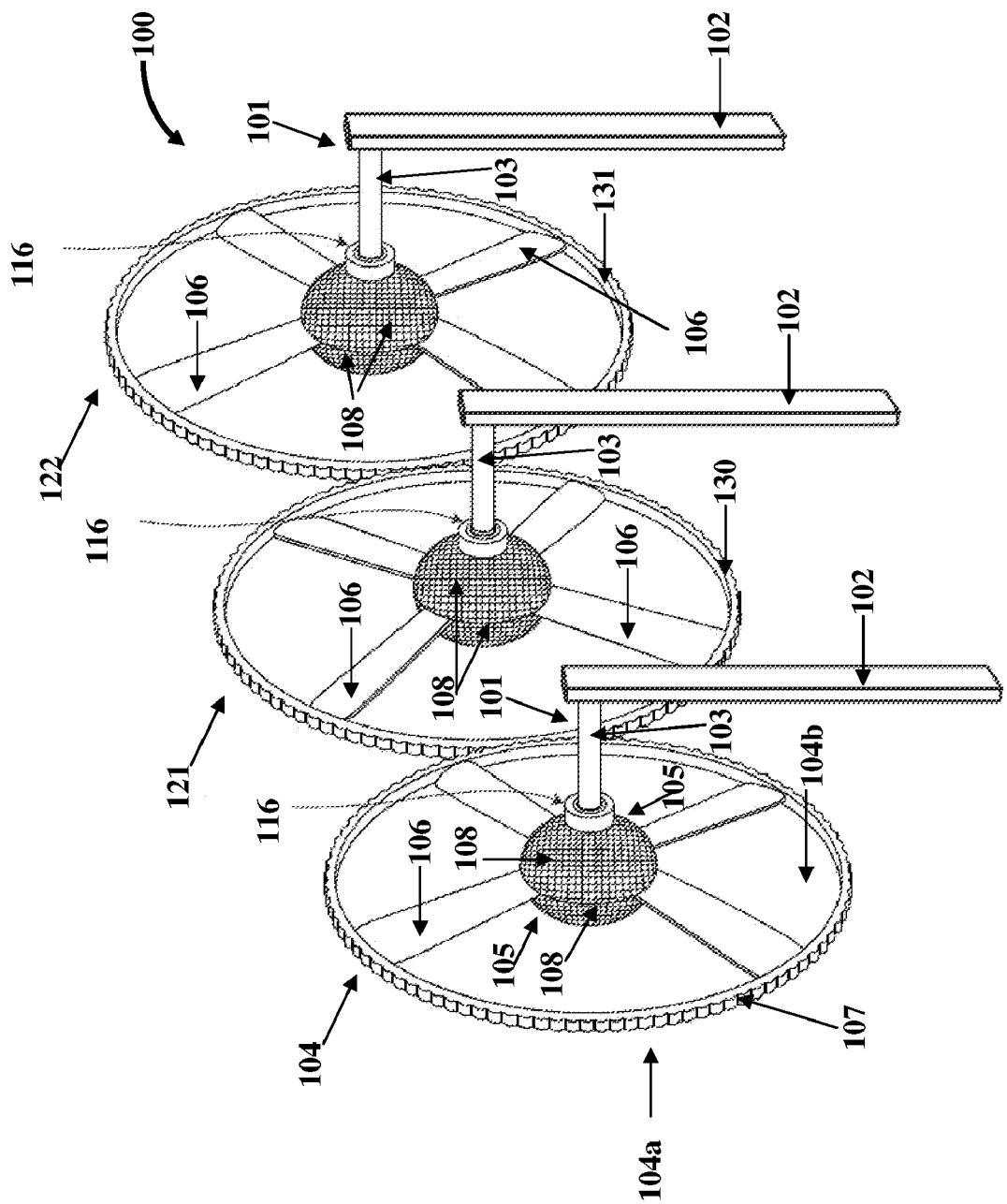
FIG. 13 exemplarily illustrates a perspective view of multiple rotor assemblies of an embodiment of the hybrid horizontal axis energy apparatus engaged via associated drive mechanisms, where a central rotatable element housing solar devices is disposed on opposing sides of each of the rotor assemblies.

FIG. 13 exemplarily illustrates a perspective view of multiple rotor assemblies 104, 121, and 122 of an embodiment of the hybrid horizontal axis energy apparatus 100 engaged via associated drive mechanisms 107, 130, and 131 respectively. In this embodiment, a spherical central rotatable element 105 housing the solar devices 108 is disposed on opposing sides 104a and 104b of each of the rotor assemblies 104, 121, and 122 for increasing exposure of the solar devices 108 to sunlight and hence for capturing additional solar energy. Each of the central rotatable elements 105 is rigidly attached on opposing sides 104a and 104b of each of the rotor assemblies 104, 121, and 122. The solar devices 108, thus, produce a greater amount of electrical energy due to the greater amount of solar energy captured.

Furthermore, the solar devices 108 may be manufactured from various processes and materials or surface films, for example, silicon, aluminum, etc., that allow the solar devices 108 to capture a greater amount of solar energy and have increased efficiency in converting solar energy to electrical energy. The processes enable, for example, the provision of integrated reflectors to concentrate solar energy on the solar devices 108. The solar devices 108 may also be configured for flexibility, which assists the solar devices 108 in taking up a desired shape for capturing a greater amount of solar energy incident on the solar devices 108.

For purposes of illustration, the detailed description refers to a central rotatable element 105 being of a generally semi-spherical shape or of a generally conical shape, and the solar devices 108 being of a spherical shape; however, the scope of the central rotatable element 105 disclosed herein is not limited to a semi-spherical shape or a conical shape and the scope of the solar devices 108 is not limited to a spherical shape but may be extended to include other shapes that assist the solar devices 108 to capture additional solar energy. For example, the central rotatable element 105 configured in an oval profile and the solar devices 108 on the central rotatable element 105 may correspondingly be of an oval shape.

Figure 14:
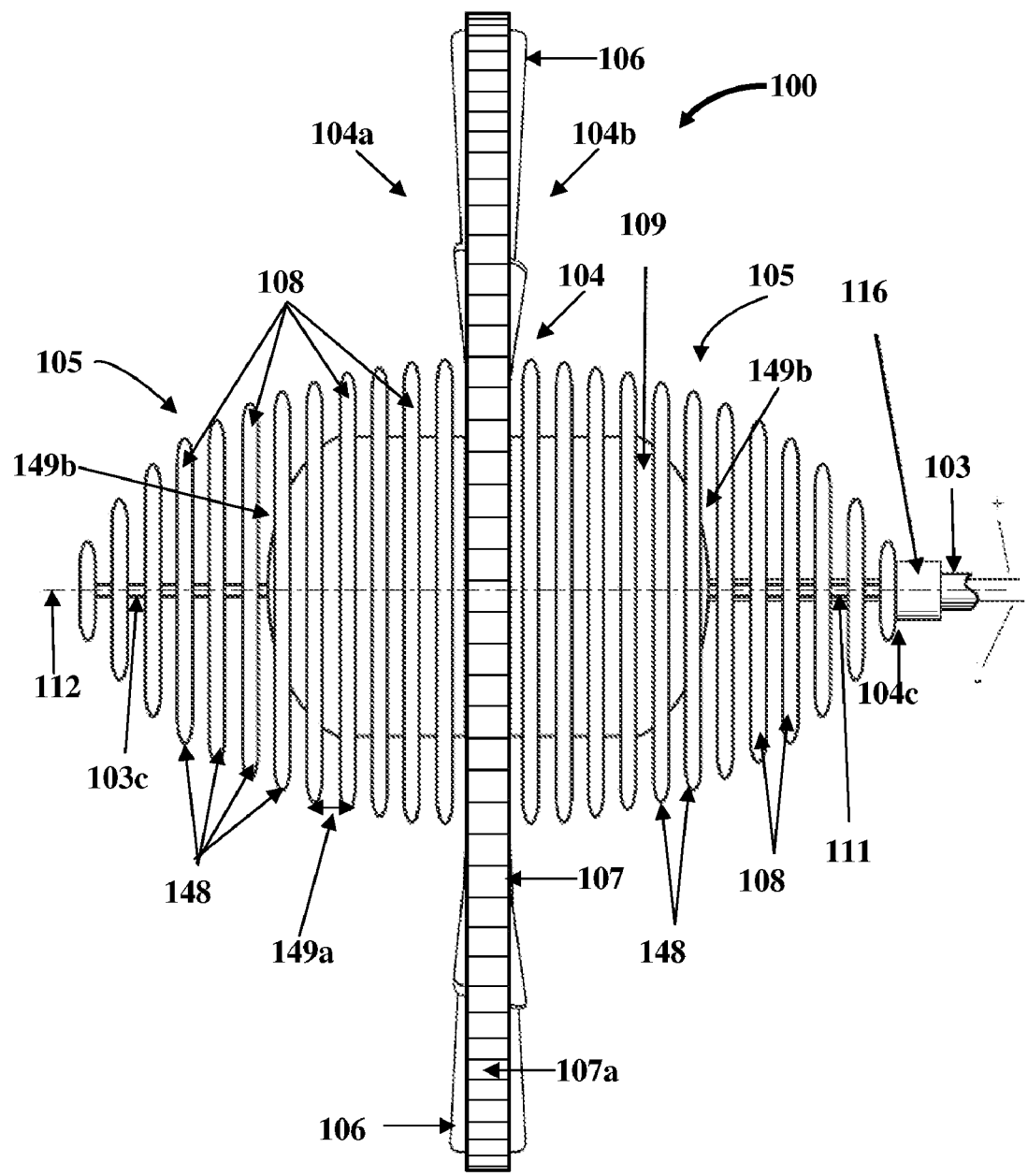
FIG. 14 exemplarily illustrates a side orthogonal view of an embodiment of the hybrid horizontal axis energy apparatus, showing solar devices configured as plates spaced apart at predetermined distances on opposing sides of the rotor assembly.

FIG. 14 exemplarily illustrates a side orthogonal view of an embodiment of the hybrid horizontal axis energy apparatus 100, showing the solar devices 108 configured as plates 148 spaced apart at predetermined distances 149a on opposing sides 104a and 104b of the rotor assembly 104. In an embodiment, the solar devices 108 on the central rotatable element 105 on each of the opposing sides 104a and 104b of the rotor assembly 104 are configured as plates 148 spaced apart at predetermined distances 149a to increase exposure of the solar devices 108 to sunlight. The solar devices 108 are rigidly connected to and disposed on an extended stationary axle 103c of the frame 101. In this embodiment, the motor 109 is centrally located within a space 149b defined by each central rotatable element 105 on opposing sides 104a and 104b of the rotor assembly 104. The shaft 111 of the motor 109 is disposed within the extended stationary axle 103c. The shaft 111 of the motor 109 extends outwardly from the motor 109 and connects to the stationary axle 103 of the frame 101. The slip ring 116 is connected to the solar device plates 148 on one end 104c of the rotor assembly 104 and disposed on the stationary axle 103. The solar devices 108 convert solar energy from sunlight to electrical energy. The solar device plates 148 gradually increase in cross sectional area, which enables the solar devices 108 to absorb sunlight at different intensities based on the cross sectional area of each of the solar device plates 148. The slip ring 116 is connected to and in electric communication with the solar device plates 148 to allow a continuous transfer of the electrical energy from the solar devices 108 to the energy storage devices 118a and 118b as disclosed in the detailed description of FIG. 3.

Figure 15:
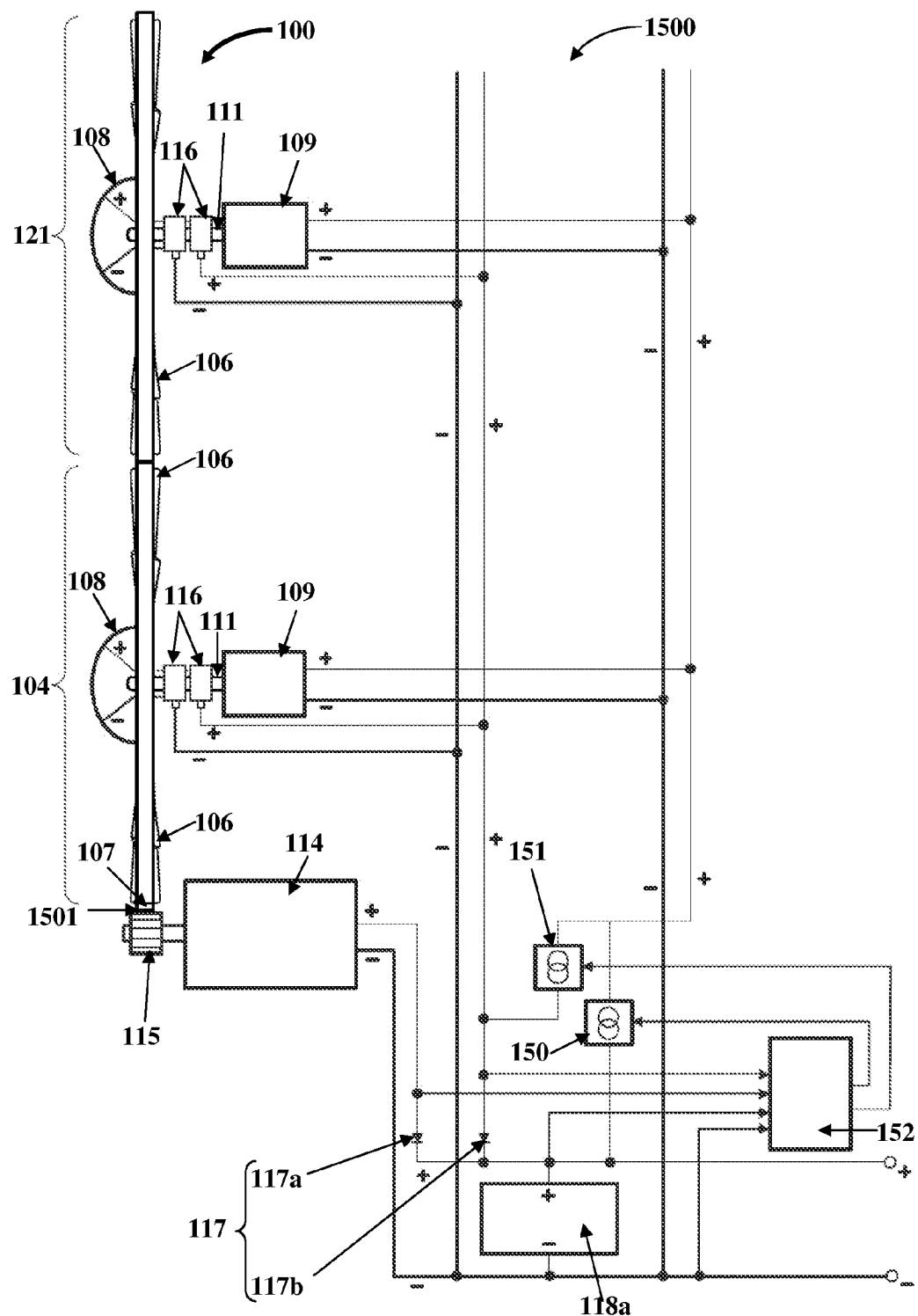
FIG. 15 exemplarily illustrates a circuit diagram for operating the hybrid horizontal axis energy apparatus.

FIG. 15 exemplarily illustrates a circuit diagram for operating the hybrid horizontal axis energy apparatus 100. The hybrid horizontal axis energy apparatus 100 disclosed herein further comprises a control unit 152, for example, an electronic controller, in electric communication with the solar devices 108 via the slip rings 116, the electrical generator 114, and an energy storage device 118a for monitoring amount of electrical energy produced by the solar devices 108 and the electrical generator 114, and stored in the energy storage device 118a, The control unit 152 commands one or more adjustable energy sources 150 and 151 to conduct electrical energy from the solar devices 108 or the energy storage devices 118a and 118b to the motor 109 for powering the motor 109. The hybrid horizontal axis energy apparatus 100 disclosed herein further comprises one or more diodes 117 in electric communication with the solar devices 108, the electrical generator 114, and the energy storage device 118a, for blocking reverse flow of electrical energy from the energy storage device 118a to the solar devices 108 and the electrical generator 114.

As exemplarily illustrated in FIG. 15, the operating circuit 1500 comprises the rotor assembly 104 having the central rotatable element 105 that houses the solar devices 108, the motor 109, the slip ring 116 electrically connected to the solar devices 108, the electrical generator 114, and the energy storage device 118a. The operating circuit 1500 further comprises the control unit 152 electrically connected to the solar devices 108 via the slip rings 116, the electrical generator 114, the energy storage device 118a, and the motor 109 via adjustable energy sources 150 and 151. The electrical energy produced by the solar devices 108 and the electrical generator 114 is stored in the energy storage device 118a. The slip ring 116 and the electrical generator 114 are electrically connected to the energy storage device 118a via the diodes 117b and 117a respectively.

During operation, the diodes 117 allow the electrical energy to flow into the energy storage device 118a when the electrical energy, for example, voltage produced by the electrical generator 114 and/or the solar devices 108 exceeds the voltage in the energy storage device 118a. When the voltage in the electrical generator 114 and/or the solar devices 108 is less than that in the energy storage device 118a, the diodes 117a and 117b block the reverse flow of the electrical energy from the energy storage device 118a to the electrical generator 114 and/or the solar devices 108 respectively, thereby preventing discharge from the energy storage device 118a.

When the voltage in the electrical generator 114 is less than that in the energy storage device 118a and the diode 117a blocks the reverse flow of electrical energy into the electrical generator 114, the voltage in the electrical generator 114 is proportional to its rotational velocity. This voltage, due to the fixed gear coupling 1501 between the electrical generator 114 and the rotor assembly 104 via the drive mechanisms 115 and 107 respectively is also proportional.

The control unit 152 monitors the voltage in the electrical generator 114, the solar devices 108, and the energy storage device 118a. The control unit 152 commands the adjustable energy sources 150 and 151, for example, current sources to conduct electrical current to the motors 109. For example, the control unit 152 preferentially commands the adjustable energy source 151 to conduct electrical energy from the solar devices 108 to the motors 109. If the electrical energy produced by the solar devices 108 is insufficient, the control unit 152 additionally or alternatively commands the adjustable energy source 150 to conduct electrical energy from the energy storage device 118a to the motors 109.

When the voltage in the electrical generator 114 or the velocity falls below a threshold value, the control unit 152 directs the adjustable energy source 151 to conduct electrical energy such as electrical current from the solar devices 108 to the motors 109. When the electrical energy generated by the solar devices 108 is less than a threshold value, the control unit 152 directs the adjustable energy source 150 to conduct electrical current to the motors 109 from the energy storage device 118a. The motors 109 convert electric current to mechanical torque, which increases the velocity of the rotor assemblies 104 and 121.

To prevent excessive charging and discharging of the energy storage device 118a, the hybrid horizontal axis energy apparatus 100 incorporates conventional battery management features to prevent premature failures.

Figure 16:
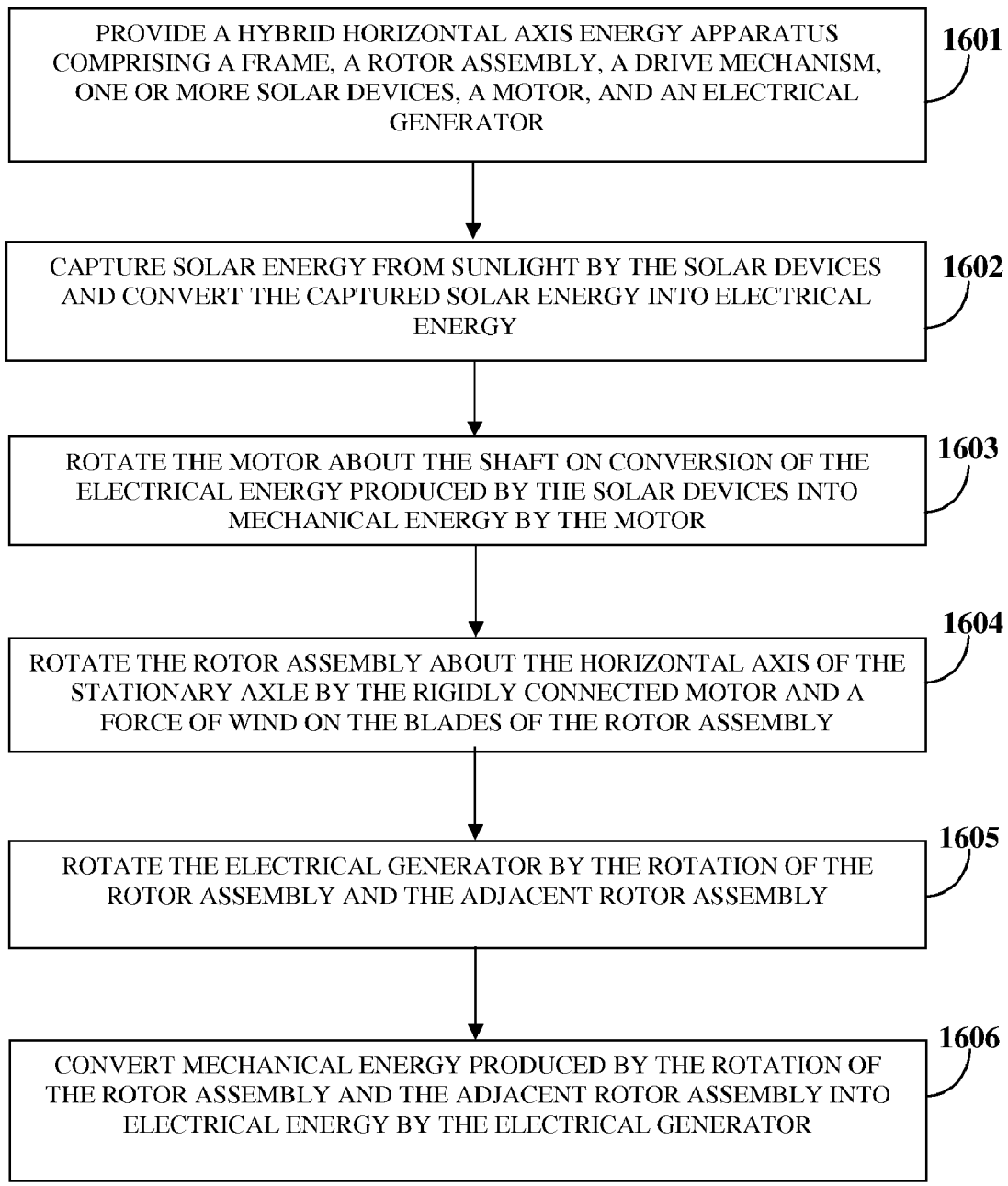
FIG. 16 illustrates a method for producing energy.

FIG. 16 illustrates a method for producing energy. A hybrid horizontal axis energy apparatus 100 comprising a frame 101, a rotor assembly 104, a drive mechanism 107, one or more solar devices 108, a motor 109, and an electrical generator 114 as disclosed in the detailed description of FIGS. 1-14 is provided 1601. The solar devices 108 capture solar energy from sunlight and convert 1602 the captured solar energy into electrical energy. The electrical energy powers the motor 109. The motor 109 rotates 1603 about its shaft 111 on conversion of the electrical energy produced by the solar devices 108 into mechanical energy by the motor 109. The rigidly connected motor 109 and the force of wind on the blades 106 of the rotor assembly 104 rotates 1604 the rotor assembly 104 about the horizontal axis 112 of the stationary axle 103 of the frame 101. A turning moment is therefore provided to the rotor assembly 104 along the horizontal axis 112 of the stationary axle 103 by the solar devices 108 and the motor 109.

In an embodiment, the rotation of the rotor assembly 104 causes rotation of the adjacent rotor assembly 121 via the engageable communication between the rotor assembly 104 and the adjacent rotor assembly 121. The electrical generator 114 rotates 1605 by the rotation of the rotor assembly 104 and the adjacent rotor assembly 121 via the drive mechanism 107 or the adjacent drive mechanism 130 respectively. The electrical generator 114 converts 1606 the mechanical energy produced by the rotation of the rotor assembly 104 and the adjacent rotor assembly 121 into electrical energy, thereby producing energy. The electrical energy produced by the solar devices 108 and the electrical generator 114 is stored in the energy storage devices 118a and 118b, which are in electric communication with the solar devices 108 on the central rotatable element 105 of the rotor assembly 104 and the electrical generator 114.

Consider an example where multiple rotor assemblies 104, 121, 122, 123, 124, 125, 126, 127, 128, and 129 of the hybrid horizontal axis energy apparatus 100 are rigidly mounted on an elevated surface, for example, on a roof of a house. The hybrid horizontal axis energy apparatus 100 is exposed to sunlight and a force of wind. The force of wind impacts the blades 106 of each of the rotor assemblies 104, 121, 122, 123, 124, 125, 126, 127, 128, and 129 and pushes the blades 106 to create a turning moment. This turning moment causes each of the rotor assemblies 104, 121, 122, 123, 124, 125, 126, 127, 128, and 129 to rotate about their associated stationary axles 103. The alternate rotor assemblies 104, 122, 124, 126, 128, and 129 or 121, 123, 125, 127, and 129 of the hybrid horizontal axis energy apparatus 100 rotate in a clockwise direction or a counterclockwise direction as exemplarily illustrated in FIG. 6. The rotation of the rotor assemblies 104, 121, 122, 123, 124, 125, 126, 127, 128, and 129 about their associated stationary axles 103 produces a mechanical energy that is fed as input to the electrical generator 114.

The electrical generator 114 converts the mechanical energy into electrical energy. The electrical energy produced by the electrical generator 114 is fed to the energy storage devices 118a and 118b. Simultaneously, the solar devices 108 rigidly attached on the central rotatable element 105 of each of the rotor assemblies 104, 121, 122, 123, 124, 125, 126, 127, 128, and 129 is exposed to sunlight. The solar devices 108 receive solar energy from sunlight and convert the solar energy into electrical energy. The electrical energy of the solar devices 108 are used to power the motor 109 electrically connected to the solar devices 108. The body 110 of the motor 109 rotates about the shaft 111 of the motor 109, thereby assisting each of the rotor assemblies 104, 121, 122, 123, 124, 125, 126, 127, 128, and 129 in its rotation about the horizontal axis 112 of the stationary axle 103 powered by the force of wind. The electrical energy stored in the energy storage devices 118a and 118b is utilized at a later point of time. The hybrid horizontal axis energy apparatus 100 thereby produces energy.

Figure 17:
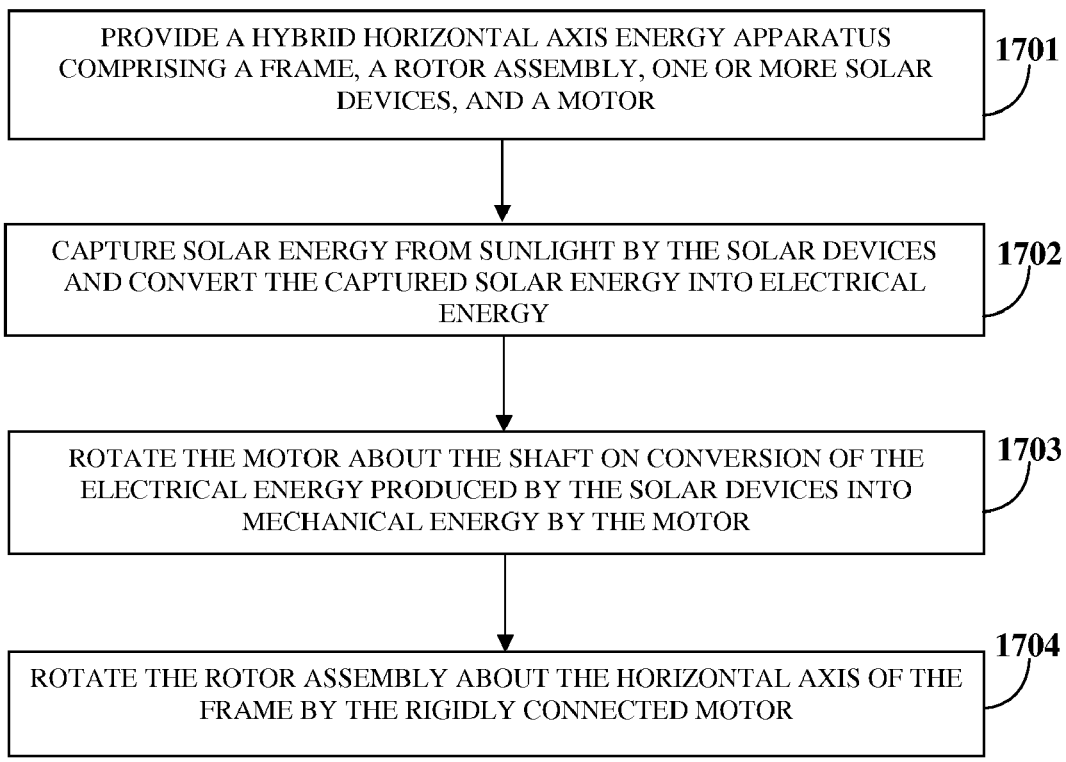
FIG. 17 illustrates a method for preventing build up of light attenuating particles on one or more solar devices housed on a rotor assembly of the hybrid horizontal axis energy apparatus.

FIG. 17 illustrates a method for preventing build up of light attenuating particles on one or more solar devices 108 housed on a rotor assembly 104 of the hybrid horizontal axis energy apparatus 100. A hybrid horizontal axis energy apparatus 100 comprising a frame 101, a rotor assembly 104, one or more solar devices 108, and a motor 109 as disclosed in the detailed description of FIGS. 1-14 is provided 1701. The solar devices 108 capture solar energy from sunlight and convert 1702 the captured solar energy into electrical energy. The electrical energy powers the motor 109. The motor 109 rotates 1703 about its shaft 111 on conversion of the electrical energy produced by the solar devices 108 into mechanical energy by the motor 109, thereby rotating 1704 the rotor assembly 104 about the horizontal axis 112 of the frame 101. The rotation of the rotor assembly 104 removes light attenuating particles, for example, dust, particulate matter, etc., from the solar devices 108 housed on the rotor assembly 104, thereby increasing efficiency of the solar devices 108. The rotation of the rotor assembly 104 also ensures that the solar devices 108 are not struck by stray objects, for example, as stones, flints, dust, dirt, mud slings, etc., since the efficiency of the solar devices 108 may be reduced if mud, dirt, dust, etc., cover or damage the solar devices 108 and restrict the exposure of the solar devices 108 to sunlight and solar energy.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

We claim:

1. A hybrid horizontal axis energy apparatus, comprising:
a frame comprising a vertical tower and a stationary axle perpendicularly connected to said vertical tower, wherein a first end of said stationary axle is rigidly connected to said vertical tower;
a rotor assembly rotatably connected to a second end of said stationary axle of said frame, wherein said rotor assembly comprises:
a central rotatable element rotatably connected to said second end of said stationary axle of said frame, wherein said central rotatable element protrudes outwardly to face sunlight; and
a plurality of blades rigidly connected to a periphery of said central rotatable element, wherein said blades extend radially from said central rotatable element, wherein said rotor assembly rotates in response to a force of wind on said blades;
a drive mechanism rigidly attached to and encircling said blades of said rotor assembly, wherein said drive mechanism is in engageable communication with an adjacent said drive mechanism rigidly attached to an adjacent said rotor assembly, wherein said rotation of said rotor assembly causes rotation of said adjacent rotor assembly via said drive mechanism;
one or more solar devices rigidly attached to said central rotatable element of said rotor assembly, wherein said one or more solar devices are exposed to said sunlight and convert solar energy of said sunlight into electrical energy;
a motor having a body and a shaft, wherein said motor is electrically connected to said one or more solar devices, and said body of said motor is rigidly connected to said central rotatable element of said rotor assembly, and wherein said shaft of said motor extends from said body of said motor and is rigidly connected to said stationary axle of said frame, wherein said body of said motor is rotatable about said shaft of said motor, and wherein said motor rotates said rotor assembly about a horizontal axis of said stationary axle of said frame on receiving said electrical energy produced by said one or more solar devices; and
an electrical generator connected proximal to said rotor assembly and in engageable communication with said rotor assembly via said drive mechanism, wherein said electrical generator converts mechanical energy produced by said rotation of said rotor assembly to electrical energy;
whereby said hybrid horizontal axis energy apparatus produces energy and prevents build up of light attenuating particles on said one or more solar devices rigidly attached to said rotor assembly by said rotation of said rotor assembly.

2. The hybrid horizontal axis energy apparatus of claim 1, wherein said rotor assembly is rotatably connected to said second end of said stationary axle of said frame via one or more bearings.

3. The hybrid horizontal axis energy apparatus of claim 1, wherein said rotation of said rotor assembly removes said light attenuating particles from said one or more solar devices rigidly attached to said central rotatable element of said rotor assembly.

4. The hybrid horizontal axis energy apparatus of claim 1, wherein said drive mechanism is one of a gear ring and a friction wheel.

5. The hybrid horizontal axis energy apparatus of claim 1, further comprising one or more energy storage devices in electric communication with said one or more solar devices on said central rotatable element of said rotor assembly and said electrical generator, wherein said one or more energy storage devices store said electrical energy produced by said one or more solar devices and said electrical generator.

6. The hybrid horizontal axis energy apparatus of claim 5, further comprising one or more slip rings connected to and in electric communication with said one or more solar devices to allow a continuous transfer of said electrical energy from said one or more solar devices to said one or more energy storage devices, wherein said one or more slip rings are disposed on said stationary axle of said frame.

7. The hybrid horizontal axis energy apparatus of claim 5, wherein said electrical energy stored in one of said one or more energy storage devices powers said motor for rotating said rotor assembly, and wherein said electrical energy stored in another one of said one or more energy storage devices is transferred to one or more external energy stations.

8. The hybrid horizontal axis energy apparatus of claim 1, further comprising a switch in electric communication with said one or more solar devices, said motor, and one or more energy storage devices, wherein said switch is configured to transfer said electrical energy produced by said one or more solar devices to one or more of said motor and said one or more energy storage devices.

9. The hybrid horizontal axis energy apparatus of claim 8, wherein said switch electrically disconnects said one or more solar devices from said motor and transfers said electrical energy produced by said one or more solar devices to said one or more energy storage devices, wherein said rotation of said rotor assembly is caused by said force of wind on said blades of said rotor assembly after said electrical disconnection.

10. The hybrid horizontal axis energy apparatus of claim 1, wherein said central rotatable element of said rotor assembly is configured in one of a plurality of profiles for housing said one or more solar devices to enable said one or more solar devices to receive said solar energy from a plurality of directions, wherein said profiles comprise a dome profile, a semispherical profile, a conical profile, a flat-ended profile, a trapezoidal profile, a pyramidal profile, and any combination thereof.

11. The hybrid horizontal axis energy apparatus of claim 1, further comprising a weatherproof seal that encapsulates said one or more solar devices on said central rotatable element of said rotor assembly for protecting said one or more solar devices from water and weather conditions.

12. The hybrid horizontal axis energy apparatus of claim 1, further comprising one or more wind sensors disposed on one or more of said blades of said rotor assembly for monitoring data of said force of wind.

13. The hybrid horizontal axis energy apparatus of claim 1, wherein said one or more solar devices are configured as plates spaced apart at predetermined distances on opposing sides of said rotor assembly for increasing exposure of said one or more solar devices to said sunlight, wherein said one or more solar devices are rigidly connected to and disposed on an extended stationary axle of said frame.

14. The hybrid horizontal axis energy apparatus of claim 1, further comprising one or more diodes in electric communication with said one or more solar devices, said electrical generator, and one or more energy storage devices, for blocking reverse flow of electrical energy from said one or more energy storage devices to said one or more solar devices and said electrical generator.

15. The hybrid horizontal axis energy apparatus of claim 1, further comprising a control unit in electric communication with said one or more solar devices, said electrical generator, and one or more energy storage devices for monitoring amount of electrical energy produced by said one or more solar devices and said electrical generator, and stored in said one or more energy storage devices, wherein said control unit commands one or more adjustable energy sources to conduct electrical energy from one of said one or more solar devices and said one or more energy storage devices to said motor for powering said motor.

16. The hybrid horizontal axis energy apparatus of claim 1, wherein said central rotatable element that houses said one or more solar devices is disposed on opposing sides of said rotor assembly for increasing exposure of said one or more solar devices to said sunlight.

17. A method for producing energy, comprising:
providing a hybrid horizontal axis energy apparatus comprising:
a frame comprising a vertical tower and a stationary axle perpendicularly connected to said vertical tower, wherein a first end of said stationary axle is rigidly connected to said vertical tower;
a rotor assembly rotatably connected to a second end of said stationary axle of said frame, wherein said rotor assembly comprises:
a central rotatable element rotatably connected to said second end of said stationary axle of said frame, wherein said central rotatable element protrudes outwardly to face sunlight; and
a plurality of blades rigidly connected to a periphery of said central rotatable element, wherein said blades extend radially from said central rotatable element, wherein said rotor assembly rotates in response to a force of wind on said blades;
a drive mechanism rigidly attached to and encircling said blades of said rotor assembly, wherein said drive mechanism is in engageable communication with an adjacent said drive mechanism rigidly attached to an adjacent said rotor assembly;
one or more solar devices rigidly attached to said central rotatable element of said rotor assembly, wherein said one or more solar devices are exposed to said sunlight;
a motor having a body and a shaft, wherein said motor is electrically connected to said one or more solar devices, and said body of said motor is rigidly connected to said central rotatable element of said rotor assembly, and wherein said shaft of said motor extends from said body of said motor and is rigidly connected to said stationary axle of said frame, wherein said body of said motor is rotatable about said shaft of said motor; and
an electrical generator connected proximal to said rotor assembly and in engageable communication with said rotor assembly via said drive mechanism;
capturing solar energy from said sunlight by said one or more solar devices and converting said captured solar energy into electrical energy, wherein said electrical energy powers said motor;
rotating said motor about said shaft on conversion of said electrical energy produced by said one or more solar devices into mechanical energy by said motor;
rotating said rotor assembly about said horizontal axis of said stationary axle of said frame by said rigidly connected motor and said force of wind on said blades of said rotor assembly, wherein said rotation of said rotor assembly causes rotation of said adjacent rotor assembly via said engageable communication between said rotor assembly and said adjacent rotor assembly; and
rotating said electrical generator by said rotation of said rotor assembly and said adjacent rotor assembly via one of said drive mechanism and said adjacent drive mechanism respectively, wherein said electrical generator converts mechanical energy produced by said rotation of said rotor assembly and said adjacent rotor assembly into electrical energy;
whereby said energy is produced by said hybrid horizontal axis energy apparatus.

18. The method of claim 17, further comprising storing said electrical energy produced by said one or more solar devices and said electrical generator in one or more energy storage devices, wherein said one or more energy storage devices are in electric communication with said one or more solar devices on said central rotatable element of said rotor assembly and said electrical generator.

19. The method of claim 17, wherein said hybrid horizontal axis energy apparatus further comprises one or more slip rings connected to and in electric communication with said one or more solar devices on said central rotatable element of said rotor assembly to allow a continuous transfer of said electrical energy from said one or more solar devices to one or more energy storage devices, wherein said one or more slip rings are disposed on said stationary axle of said frame.

* * * * *